(12) United States Patent
Yuan et al.

(10) Patent No.: US 9,163,387 B2
(45) Date of Patent: Oct. 20, 2015

(54) FAULT DETECTION, ISOLATION AND RECONFIGURATION SYSTEMS AND METHODS FOR CONTROLLING ELECTROHYDRAULIC SYSTEMS USED IN CONSTRUCTION EQUIPMENT

(75) Inventors: QingHui Yuan, Maple Grove, MN (US); Michael Berne Rannow, Roseville, MN (US); Wade Leo Gehlhoff, Shakopee, MN (US); Christy William Schottler, Chanhassen, MN (US); Vishal Mahulkar, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 485 days.

(21) Appl. No.: 13/385,779

(22) Filed: Mar. 5, 2012

(65) Prior Publication Data

US 2012/0232756 A1   Sep. 13, 2012

Related U.S. Application Data

(60) Provisional application No. 61/448,742, filed on Mar. 3, 2011.

(51) Int. Cl.
G06F 7/70 (2006.01)
E02F 9/26 (2006.01)
(Continued)

(52) U.S. Cl.
CPC .............. *E02F 9/268* (2013.01); *E02F 9/226* (2013.01); *E02F 9/2296* (2013.01); *F15B 19/002* (2013.01); *F15B 19/005* (2013.01); *G05B 23/0286* (2013.01); *G05B 23/0289* (2013.01)

(58) Field of Classification Search
CPC .... B66F 11/046; B66F 17/006; E02F 9/2025; E02F 9/22; F15B 20/002; F15B 20/008; G03G 15/6573; G03G 21/206; G05B 19/0423; G05B 2219/37537
USPC ............................................ 701/41, 50, 29.7
See application file for complete search history.

(56) References Cited

U.S. PATENT DOCUMENTS 5,299,420 A * 4/1994 Devier et al. ................... 60/403
8,352,129 B2 * 1/2013 Yuan et al. ...................... 701/50
(Continued)

FOREIGN PATENT DOCUMENTS

CN          1462328 A    12/2003
EP        1 300 595 A2    4/2003
(Continued)

OTHER PUBLICATIONS

Invitation to Pay Additional Fees with Partial International Search mailed Jun. 22, 2012.
(Continued)

*Primary Examiner* — Redhwan k Mawari
(74) *Attorney, Agent, or Firm* — Merchant & Gould P.C.

(57) ABSTRACT

The present disclosure relates to fault detection, isolation and reconfiguration schemes, architectures and methods for use in electrohydraulic actuation systems for construction equipment. In one embodiment, a supervisory controller adapted to interface with a main controller of the construction vehicle is provided. A plurality of control nodes that interface with the supervisory controller are also disclosed, each of which includes pressure and position sensors. The nodes also include a first actuator control node for controlling operation of a first hydraulic actuator, a second actuator control node for controlling operation of a second hydraulic actuator, and a pump control node. The control system has an architecture in which faults are detected and isolated at the supervisory controller level and, where possible, within each of the control nodes at a sensor level, a component level, and a subsystem level.

17 Claims, 30 Drawing Sheets

(51) Int. Cl.
*E02F 9/22* (2006.01)
*F15B 19/00* (2006.01)
*G05B 23/02* (2006.01)

(56) References Cited

U.S. PATENT DOCUMENTS

2004/0085184 A1* 5/2004 Sigmund .................... 340/3.42
2004/0186687 A1 9/2004 Ogura et al.
2008/0312756 A1* 12/2008 Grichnik et al. ............... 700/29
2009/0158624 A1* 6/2009 Hartwick ....................... 37/347
2010/0095835 A1* 4/2010 Yuan et al. .................... 91/392

2011/0126608 A1 6/2011 Gehlhoff et al.

FOREIGN PATENT DOCUMENTS

GB 2 419 429 A 4/2006
JP 8-320726 12/1996
JP 2002-89516 3/2002

OTHER PUBLICATIONS

International Search Report and Written Opinion mailed Oct. 15, 2012.

* cited by examiner

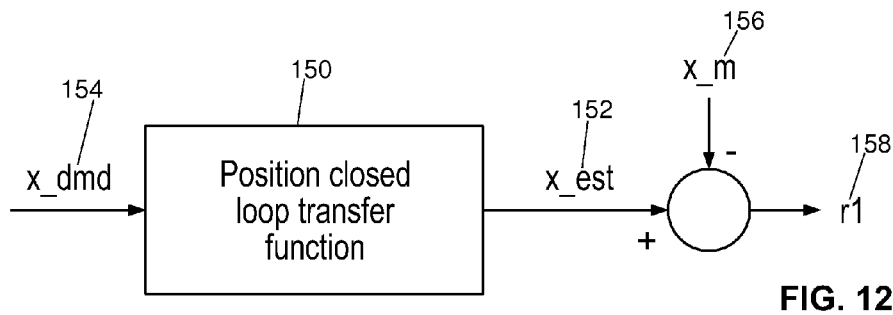

FIG. 12

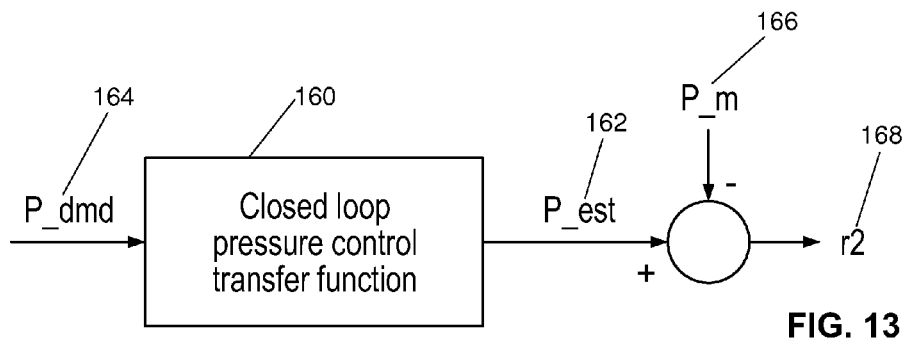

FIG. 13

| | Description | Parameters |
|---|---|---|
| Rsys1 | Build two virtual flow meter, Q1 and Q2. if \|Q1 - Q2\| > Q_threshold, then a sensor fault is detected in this module Q1 calculation method:<br>if in pre-charge mode<br>    Q1 = f1(Ps - Pacc, x1) if x1>0<br>    Q1 = f2(Pacc - Pt, x1) if x1<0<br>else if in BSS mode<br>    Q1 = f3(Pacc - Pboom, x2)<br>Q2 calculation method<br>    Q2 = f4(Pacc, dot_Pacc) | flow map f1(.,.): precharge spool pressure side<br>flow map f2(.,.): precharge spool tank side<br>flow map f3(.,.): damping spool accumulator flow map f4(p, dot_p), output is flow rate given a pressure and pressure dot. Q_threshold: a value determine a fault has occurred. |

FIG. 14

| Case # | FD | FI | Reconfig |
|---|---|---|---|
| Case 1 | Q3 != others<br>Q1 == Q2 | Accumulator piston sensor fault | Stop the supervisoary control using piston sensor.<br>BSS local control no change |
| Case 2 | Q1 != others<br>Q2 == Q3 | The sensor other than accumulator pressure sensor fails | Shut off PWMs for BSS |
| Case 4 | Q1 != Q2 != Q3 | accumulator pressure sensor fails | Shut off PWMs for BSS |
| Case 5 | Q1 == Q2<br>== Q3 | No fault | |

| Case 1 | V_cyl_1 != others<br>V_cyl_2 == V_cyl_3 | Cylinder sensor fault |
|---|---|---|
| Case 2 | V_cyl_2 != others<br>V_cyl_1 == V_cyl_3 | Head side valve pressure or position sensor fault. (can be further isolated to each sensor, see other IP disclosures) |
| Case 3 | V_cyl_3 != others<br>V_cyl_1 == V_cyl_2 | Rod side valve pressure or position sensor fault (can be further isolated to each sensor, see other IP disclosures) |
| Case 4 | V_cyl_1 != V_cyl_2 != V_cyl_3 | More than one sensor faults |
| Case 5 | V_cyl_1 == V_cyl_2 == V_cyl_3 | No fault |

FIG. 17

| Case 1 | V_cyl_1 != others<br>V_cyl_2 == V_cyl_3 | Support user cylinder sensor value in the supervisory control. |
|---|---|---|
| Case 2 | V_cyl_2 != others<br>V_cyl_1 == V_cyl_3 | If P_h faulty,<br>    P_h_est = map(Q_est, x_h, T)<br>If x_h faulty,<br>    x_h_est = map(Q_est, P_h, T)<br>Note that Q_est can be retrieved from V_cyl_1 and/or V_cyl_3.<br>Note if Q_est can be estimated from v_cyl_1 only if rod side has anti-cavitation mechanism so that it cannot provide flow estimate. |
| Case 3 | V_cyl_3 != others<br>V_cyl_1 == V_cyl_2 | If P_r faulty,<br>    P_r_est = map(Q_est, x_r, T)<br>If x_h faulty,<br>    x_r_est = map(Q_est, P_r, T)<br>Note that Q_est can be retrieved from V_cyl_1 and/or V_cyl_1. |
| Case 4 | V_cyl_1 != V_cyl_2 != V_cyl_3 | More than one sensor faults. Go to fail safe condition |
| Case 5 | V_cyl_1 == V_cyl_2 == V_cyl_3 | N/a |

FIG. 18

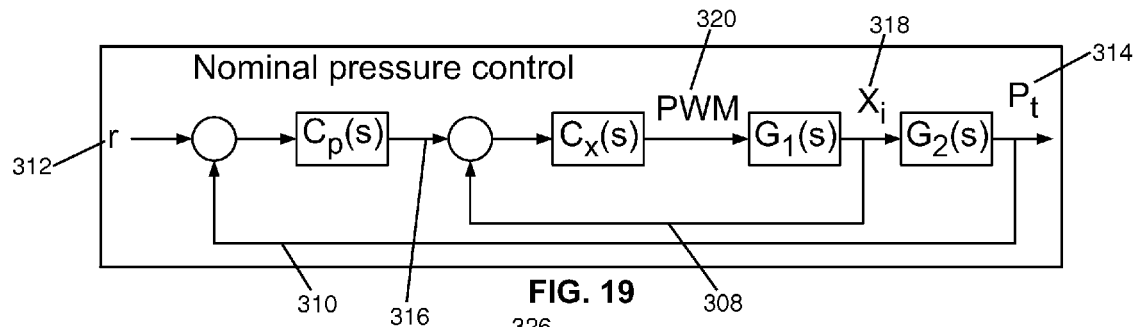
FIG. 19
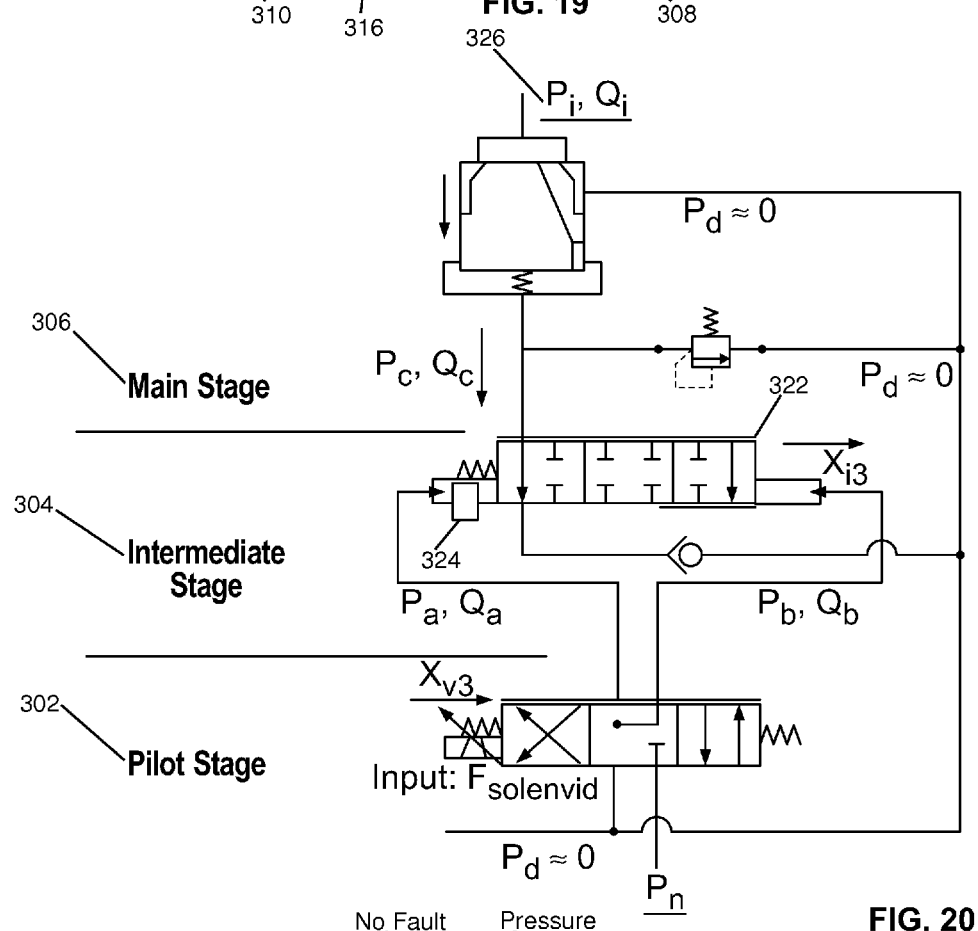
FIG. 20
Diagnostic matrix
| F/S | $f_0$ | $f_1$ | $f_2$ |
|---|---|---|---|
| $R_1$ | OFF | OFF | ON |
| $R_2$ | OFF | ON | ON |
$f_0$: No Fault
$f_1$: Pressure Sensor Fault
$f_2$: Position Sensor Fault
FIG. 21

| Priority | 1 | 2 | 3 | 4 | 5 | 6 | 7 | 8 | 9 | 10 | 10 |
|---|---|---|---|---|---|---|---|---|---|---|---|
| Rs1 | ON | | | | | | | | | | |
| Rs2 | | On | | | | | | | | | |
| Rs3 | | | On | | | | | | | | |
| Rs4 | | | | On | | | | | | | |
| Rc1 | | | | | On | | | | | | |
| Rc2 | | | | | | | | | On | | |
| Rc3 | | | | | | | On | | | | |
| Rc4 | | | | | | On | | | | | |
| Rc5 | | | | | | | | On | | | |
| Rsys1 | | | | | | | | | | On | On |
| Mode | | | | | | | | | Pre Charge | Pre Charge | Damping |
| Fault Isolation | 1 | 2 | 3 | 4 | 1 | 3 | 1 | 1 | 5 | 5 | 5 |
| | | | | | | | | | un-isolate | un-isolate | un-isolated |

| 1 | 2 | 3 | 4 | 5 | 7 |
|---|---|---|---|---|---|
| pos_prechar | pres_ACC | pos_damp | pres_Boom | Un-isolated | no fault |

FIG. 22

| 1=xr | 2=Pr | 3=xh | 4=Ph | 5=Pbss | 6=unknow | 7=no fault |
|---|---|---|---|---|---|---|

| | Single Flag Faults | | | | | | | | | 2 flag, pos f | | | | | | | Single flag + 1 subsys | | | | | | |
|---|---|---|---|---|---|---|---|---|---|---|---|---|---|---|---|---|---|---|---|---|---|---|---|---|
| Rs1_r | X | | | | | | | | | X | | | X | | | | | | | | | | | |
| Rs2_r | | X | | | | | | | | X | X | X | | | | | | | | | X | | | |
| Rc1_r | | | X | | | | | | | X | | | | X | | | | | | | | | | |
| Rc3_r | | | | X | | | | | | X | | | | | X | | | | | | | | | |
| Rsubsys_r | | | | | X | | | | | | | | | | | X | X | X | | X | | X | X | X |
| Rs1_h | | | | | | X | | | | | | | X | | | | | | X | | | | | |
| Rs2_h | | | | | | | X | | | | | | X | X | X | | | | | X | | | | |
| Rc1_h | | | | | | | | X | | | | | X | | | X | | | | | | | | |
| Rc3_h | | | | | | | | | X | | | | X | | | | X | | | | | | | |
| Rsubsys_h | | | | | | | | | | X | | | | | | | | | X | X | X | X | X | X | X |
| Rsys-BSS | | | | | | | | | | | X | | | | | | | | | | | X | X | X |
| Fault | 1 | 2 | 1 | 1 | 6 | 3 | 4 | 3 | 3 | 6 | 5 | 1 | 1 | 1 | 3 | 3 | 3 | 1 | 1 | 1 | 3 | 3 | 3 | 2 | 4 | 6 | 4 | 4 | 4 |

| | 560 | |
|---|---|---|
| C1 | condition: abs(X_des - Xw) > SS_error<br>window: .5 s<br>SS_error: 50 um | abs(X_des - Xw) <= SS_error |
| C2 | PWM velocity check | |
| C3 | condition: abs(Ps_work - Pls_work - 15) > SS_error<br>window: .5 s<br>SS_error: 3 bars | abs(Ps_work - Pls_work - 15) <= SS_error |
| C4 | condition: Ps_work < Pls_work<br>window: 0s | Ps_work > Pls_work |
| C5 | abs(P_des - Ps_work) > SS_error<br>window: .5 s<br>SS_error: 3 bars | abs(P_des - Ps_work) <= SS_error |
| C6 | condition: abs(X_des - Xs) > SS_error<br>window: .6 s<br>SS_error: 50 um | abs(X_des - Xs) <= SS_error |
| C7 | PWM velocity check | |
| C8 | condition: Pls_steer < Plss | Pls_steer > Plss |
| C9 | condition: Pls_steer tracks/greater than Plss + Pressure_Margin<br>Pressure_Margin = 8 bars<br>Pls_steer - Plss - 8 < S_error<br>window: .5 s<br>SS_error: 2 bar | Pls_steer >= Plss + 8 |
| C10 | condition: Pls_steer + Pump_Margin <= Pcf_steer<br>Pump_Margin = 15 bars<br>window: .2 s | Pls_steer + Pump_Margin - PriorityValve_Pressure_Drop = Pcf |
| C11 | condition: abs(Pls_steer + 15 - Pcf_steer) > SS_error<br>window: .2s<br>SS_error: 5 bars (Priorty valve max pressure drop) | |
| C12 | condition: Pcf - Plss - Steering_Demand_Margin < 0<br>window: .2s<br>Steering_Demand_Margin = 15 bars | Pcf >= Plss + Steering_Demand_Margin |
| C13 | 300 bars < Pcf_steer II Pcf_steer < 0 | Out of Range |
| C14 | 300 bars < Plss II Plss < 0 | Out of Range |
| C15 | 300 bars < Pls_steer II Pls_steer < 0 | Out of Range |

| | | Description | | | | | | | | | | | | |
|---|---|---|---|---|---|---|---|---|---|---|---|---|---|---|
| | Drift | | | | | | | | | | | | | |
| Xs | Noise | | X | | | | | X | | | | | | |
| | OoR -ve max | Much larger steering displacement, slightly larger jerk towards | X | | | | | X | | X | | | | |
| | OoR +ve max | Smaller steering displacement with slower velocity | X | | | | | X | | X | | X | | |
| | Stuck | Large jerk | X | | | | | X | | | | | X | X |
| | Offset -ve | | | | | | | | | X | | X | | |
| | Offset +ve | | | | | | | | | | | X | | |
| | Drift | | | | | | | | | | | | | |
| Pls_work | Noise | No performance degradation | X | | | | X | | | | | | | |
| | OoR -ve max | Faster response going down slower response going up | X | | | X | X | | | | | | | |
| | OoR +ve max | Slower response going down faster response going up. SS err | X | | | X | X | | | | | | | |
| | Stuck | Some overshoot and slightly slower response | X | | | X | X | | | | | | | |
| | Offset -ve | Slower response going up with SS error | | | | X | | | | | | | | |
| | Offset +ve | Faster response going up with overshoot | | | | X | | | | | | | | |
| | Drift | | | | | | | | | | | | | |
| Xw | Noise | | X | | | | X | | | | | | | |
| | OoR -ve max | Loss of control | X | | | X | X | | | | | | | |
| | OoR +ve max | Loss of control | X | | | X | X | | | | | | | |
| | Stuck | Loss of control | X | X | X | | | | | | | | | |
| | Offset -ve | Slower response coming down faster going up. Offset errors initially which go to zero due to integrator | | | | | X | | | | | | | |
| | Offset +ve | Faster response coming down slower response going up | | | | | X | | | | | | | |
| | Drift | | | | | | | | | | | | | |

FIG. 27 (Cont.)

| | | Sensor level FD | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|---|
| | | Conditions Valid for Flow sharing mode | | | | | | | | | | | | | | | |
| Pdf_steer | Noise | Steering response same as nominal | X | | | | | | | | | | | | | | |
| | OoR -ve max | Steering response same as nominal | X | | | | | | | | | | | | X | | |
| | OoR +ve max | Steering response same as nominal | X | | | | | | | | | | | X | X | | |
| | Stuck | Steering response same as nominal | X | | | | | | | | | | | | | | |
| | Offset -ve | Steering response same as nominal | | | | | | | | | | X | | X | X | | |
| | Offset +ve | Steering response same as nominal | | | | | | | | | | X | | X | X | | |
| | Drift | | | | | | | | | | | | | | | | |
| Piss | Noise | Steering response same as nominal | X | | | | | | | | | | | | | | |
| | OoR -ve max | Work: Same as nominal. Steering: Smaller steering displacement with slower velocity. Large jerk towards the end | X | | | | | | | X | | | | | | | |
| | OoR +ve max | Work: Unstable in flow sharing mode. May be related to lack of proper controller/model tuning in FS mode. Steering: Much larger steering displacement, large jerk. | X | | | | | | | X | X | | | X | | | |
| | Stuck | Work: Same as nominal. Steering: Larger jerk towards the end. Smaller cylinder displacement with slower velocity | X | | | | | | | | X | | | X | | | |
| | Offset -ve | Work: Same as nominal. Steering: Much larger steering displacement, large jerk | | | | | | | | | | | | | | X | |
| | Offset +ve | Work: Same as nominal. Steering: Larger steering displacement, large jerk towards the end | | | | | | | | | X | | | X | | X | |

| | | | | | | | | | | | |
|---|---|---|---|---|---|---|---|---|---|---|---|
| Xs | OoR +ve max | Work: Cannot enter flow sharing after fault. Steering: Much smaller steering displacement with slower velocity | X | | | X | | | | | |
| | Stuck | Work: Unstable in flow sharing mode. Could be related to lack of proper tuning. Steering: Smaller displacement, large jerk | X | | | | X | X | | | |
| | Offset -ve | Work: Unstable in flow sharing mode. Could be related to lack of proper tuning. Steering: Smaller displacement, large jerk | | | | X | X | X | | | |
| | Offset +ve | Work: Unstable in flow sharing mode. Could be related to lack of proper tuning. Steering: Smaller displacement, large jerk | | | | X | X | X | | | |
| | Drift | | | | | | | X | | | |
| Pls_work | Noise | Response same as nominal. Larger steering cylinder jerk. | X | | | | | | | | |
| | OoR -ve max | Work: Flow sharing unsuccessful after fault introduction. Steering: Larger steering cylinder displacement | X | | | | | | | | |
| | OoR +ve max | Work: Slow response coming down. Steering: Same as nominal | X | | | | | | | | |
| | Stuck | Work: Flow sharing unsuccessful after fault introduction. Steering: Larger steering cylinder displacement. Larger initial jerk. Smaller final jerk. | X | | | | | | | | |
| | Offset -ve | Work: Flow sharing unsuccessful after fault introduction. Steering: Larger steering cylinder displacement. Larger initial jerk. Smaller final jerk. | X | | | | | | | | |

| | | | | | | | | | | | | |
|---|---|---|---|---|---|---|---|---|---|---|---|---|
| | Offset +ve | Work: Same as nominal<br>Steering: Slightly larger jerk towards the end | | | | | | | | | | |
| | Drift | | | | | | | | | | | |
| | Noise | Response same as nominal | X | | | | | | | | | |
| | CoR -ve max | Work: Pressures saturate no control flow sharing mode takes care of pressures beyond saturation point of work pump.<br>Steering: Same as nominal | | X | | | | | | | | |
| | CoR +ve max | Work: Loss of control. Work pump destrokes after fault. Cannot enter flow sharing after fault.<br>Steering: Larger cylinder displacement. Larger jerk at the beginning. | | X | X | | | | | | | |
| Xw | Stuck | Work: Loss of control. Cannot enter flow sharing mode. Supply oscillations.<br>Steering: Larger cylinder displacement. Larger jerk at the beginning. | | X | X | X | | | | | | |
| | Offset -ve | Work: Offset error while coming down. Goes to zero. Faster response going up.<br>Steering: Same as nominal | | | | | | | | | | |
| | Offset +ve | Work: Same as nominal<br>Steering: Same as nominal | | | | | | | | | | |
| | Drift | | | | | | | | | | | |

FIG. 28 (Cont.)

| NO FLOW SHARING MODE | | | | | | | | | | | | | | |
|---|---|---|---|---|---|---|---|---|---|---|---|---|---|---|
| Assumption: Only faults that cannot identified by sensor level detection are considered here | | | | | | | | | | | | | | |
| Scenarios / Conditions | 1 | 2 | 3 | 4 | 5 | 6 | 7 | 8 | 9 | 10 | 11 | 12 | 13 | |
| C1 | | | | | | | | | | | | X | | |
| C2 | | | | | | | | | | | | X | | |
| C3 | | | | | | | | | | X | X | | | |
| C4 | | | | | | | | | | X | X | | | |
| C5 | | | | | | | | | | | | X | X | |
| C6 | | | | | | | | | X | | | | | |
| C7 | | | | | | | | | X | | | | | |
| C8 | X | X | | | | | X | X | | | | | | |
| C9 | X | X | | | | | X | | | | | | | |
| C10 | | | X | X | X | | X | | | | | | | |
| C11 | | | X | X | X | X | X | | | | | | | |
| C12 | | | | | X | X | | | | | | | | |
| C13 | | | | | X | X | | | | | | | | |
| C14 | X | X | | X | | X | | | | | | | | |
| C15 | | | | | | | | | | | | | | |
| | Plss | Plss | Pcf | Pcf | Pcf | | | | | | | | | |
| | | | Pls_steer | | | Pls_steer | Pls_steer | | | | | | | |
| | | | | | | | | Xs | Xs | | | | | |
| | | | | | | | | | | Pls_work | Pls_work | | | |
| | | | | | | | | | | | | Xw | Xw | |

FIG. 29

FLOW SHARING MODE

Assumption: Only faults that cannot identified by sensor level detection are considered here

| Scenarios / Conditions | 1 | 2 | 3 | 4 | 5 | 6 | 7 | 8 | 9 | 10 | 11 | 12 | 13 |
|---|---|---|---|---|---|---|---|---|---|---|---|---|---|
| C1 |  |  |  |  |  |  |  |  |  |  |  | X |  |
| C2 |  |  |  |  |  |  |  |  |  |  |  | X |  |
| C3 |  |  | X |  |  |  |  |  |  |  |  |  |  |
| C4 |  |  |  |  |  |  |  |  |  |  |  |  |  |
| C5 |  |  |  |  |  |  |  | X |  |  |  | X |  |
| C6 |  |  |  |  |  |  |  |  | X | X |  |  |  |
| C7 |  |  |  |  |  | X | X |  |  |  |  |  |  |
| C8 |  |  |  |  |  |  | X | X |  |  |  |  |  |
| C9 |  | X |  |  | X | X |  |  |  |  |  |  |  |
| C10 |  | X | X |  | X |  |  |  |  |  |  |  |  |
| C11 |  |  |  |  |  |  |  |  |  |  |  |  |  |
| C12 |  | X |  | X |  |  |  | X |  |  |  |  |  |
| C13 |  |  |  |  |  |  |  |  |  |  |  |  |  |
| C14 | X |  |  |  |  |  |  |  |  |  |  |  |  |
| C15 |  |  |  |  |  | X |  | X |  |  |  |  |  |
|  | Pcf | Pcf | Pcf | Pcf |  |  |  |  |  |  |  |  |  |
|  | Plss | Plss | Plss |  |  |  |  |  |  |  |  |  |  |
|  |  |  | Pls_steer | Pls_steer |  |  |  | Pls_steer | Pls_steer | Pls_steer |  |  |  |
|  |  |  |  |  |  |  |  | Xs |  | Pls_work |  |  |  |
|  |  |  |  |  |  |  |  |  |  |  | Xw |  |  |

FIG. 30

FAULT DETECTION, ISOLATION AND RECONFIGURATION SYSTEMS AND METHODS FOR CONTROLLING ELECTROHYDRAULIC SYSTEMS USED IN CONSTRUCTION EQUIPMENT

CROSS-REFERENCE TO RELATED APPLICATION

This application claims the benefit of U.S. Provisional Patent Application Ser. No. 61/448,742, filed Mar. 3, 2011, which application is hereby incorporated by reference in its entirety.

TECHNICAL FIELD

The present disclosure relates generally to control systems for use in electrohydraulic systems. More particularly, the present disclosure relates to fault detection, isolation and reconfiguration systems for controlling electrohydraulic systems for construction equipment.

Heavy construction vehicles such as excavators (e.g. front end loaders, backhoes, wheel loaders, etc.) typically include hydraulic actuation systems for actuating various components of the equipment. For example, front end loaders are equipped excavation booms that are raised and lowered by lift hydraulic cylinders. Often, a bucket is pivotally mounted at the end of the excavation boom. A tilt cylinder is used to pivot/tilt the bucket relative to the excavation boom. Additionally, the front end loader can include a boom suspension system that dampens vibrations and impacts to improve operator comfort. A typical boom suspension system includes a hydraulic accumulator. A typical hydraulic actuation system also includes a hydraulic pump for providing pressurized hydraulic fluid to the system and a reservoir tank from which the hydraulic pump draws hydraulic fluid.

It is known in the art to utilize sensors (e.g. pressure sensors, position sensors) for using use in controlling the operation of a hydraulic actuation system. For safety and reliability, it is known to provide fault detection systems for identifying when one or more sensors fail.

SUMMARY

The present disclosure relates to fault detection, isolation and reconfiguration schemes, architectures and methods for use in hydraulic actuation systems.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclose herein are based.

DRAWINGS

FIG. 12 shows logic for detecting a component level fault with respect to spool position.

FIG. 13 shows control logic for detecting a component level fault with respect to pressure.

FIG. 14 is a chart showing an example subsystem level fault detection technique.

FIG. 17 shows an isolation matrix in accordance with the principles of the present disclosure.

FIG. 18 shows another isolation matrix in accordance with the principles of the present disclosure.

FIG. 19 shows a control loop strategy in accordance with the principles of the present disclosure for controlling a multistage valve.

FIG. 20 shows an example multistage valve that can be controlled by the control strategy of FIG. 19.

FIG. 21 is an isolation matrix for isolating faults detected in the valve of FIG. 20.

FIG. 22 is another fault isolation matrix in accordance with the principles of the present disclosure.

FIG. 23 is another fault isolation matrix in accordance with the principles of the present disclosure.

FIG. 25 is a schematic view of a number of fault detection and isolation tables that can be stored on a controller of the hydraulic system shown in FIG. 24.

FIG. 26 is a schematic view of an example embodiment of the fault detection table shown in FIG. 25.

FIG. 27 is a schematic view of an example embodiment of the non-flow share primary fault isolation matrix shown in FIG. 25.

Figure 28:
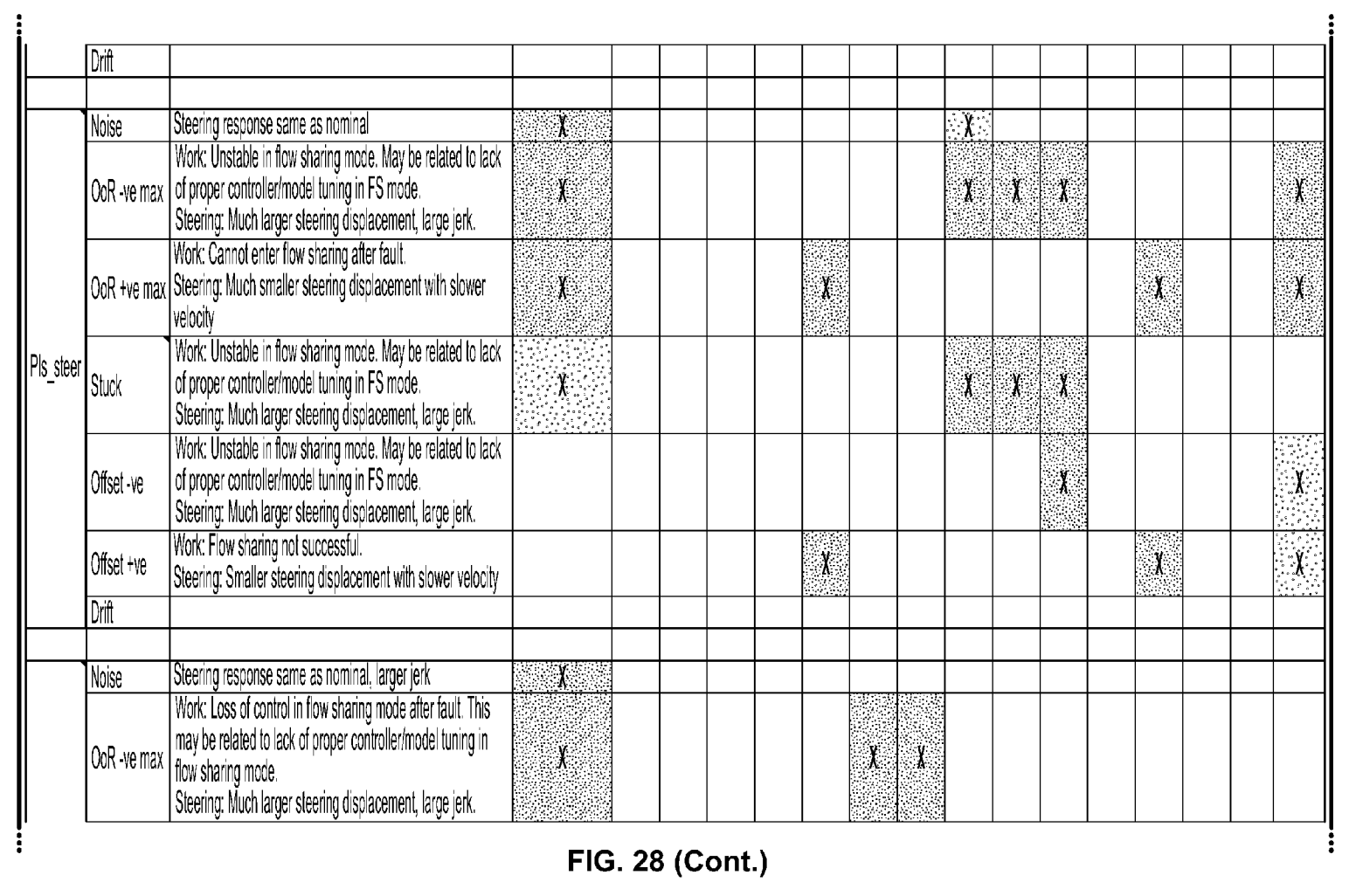

FIG. 28 is a schematic view of an example embodiment of the flow share primary fault isolation matrix shown in FIG. 25.

FIG. 29 is a schematic view of an example embodiment of the non-flow share secondary fault isolation matrix shown in FIG. 25.

FIG. 30 is a schematic view of an example embodiment of the flow share secondary fault isolation matrix shown in FIG. 25.

DETAILED DESCRIPTION

The present disclosure relates generally to fault detection, isolation and reconfiguration schemes for use in hydraulic actuation systems. In certain embodiments, a control system architecture is used that is modularized and distributed. By using a modularized approach, the system can be reduced in complexity and can provide enhanced flexibility. By using a distributed architecture with overlapping and redundant fault detection strategies, fault isolation is enhanced. Moreover, overlapping and redundant fault detection strategies provide various options for reconfiguring a system to allow the system to continue to operate even when a failed sensor has been isolated from the system. In certain embodiments, analytical redundancies are provided by using an operational relationship between a first component and one or more second components (e.g., valves) to generate a reference parameter (e.g., flow) from the one or more second components that can be compared to a corresponding operational parameter (e.g., flow) of the first component. The reference and operational parameters can be determined based on flow mapping techniques or other techniques. Based on the comparison between the reference parameter and the operational parameter, it can be determined whether a fault exists. The fault may be caused by the failure of one of many different sensors within one node or across several nodes. Analysis (e.g., matrix based analysis) can be used at the node level and/or at the system level to isolate (i.e., specifically identify) the faulty sensor. Once the sensor has been isolated, the virtual reference parameter can be used to generate a virtual signal that can be substituted into a control algorithm for the first component in place of the faulty signal from the failed and isolated sensor. In this way, the system can continue to operate while data from the faulty sensor is not used in the control algorithm for the first component.

I. General Architecture Overview

Figure 1:
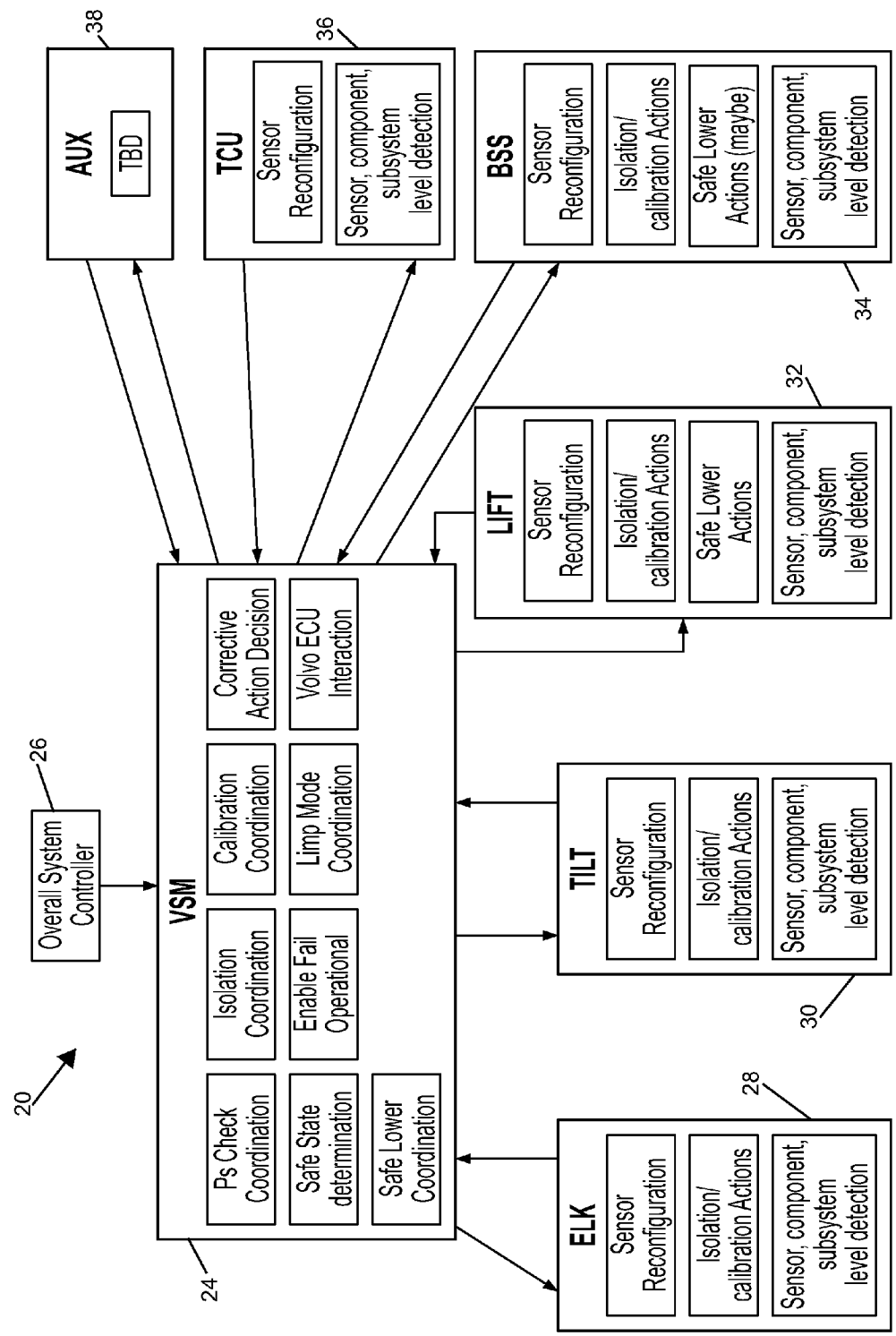
FIG. 1 is a block diagram showing a control architecture in accordance with the principles of the present disclosure.

FIG. 1 illustrates an example fault detection, isolation and reconfiguration (FDIR) architecture 20 in accordance with the principles of the present disclosure. The FDIR architecture 20 is adapted to provide control of a hydraulic actuation system of a vehicle such as a construction vehicle. In one example embodiment, the FDIR architecture 20 can be used to control a hydraulic actuation system of a wheel loader 22 (see FIG. 2). The FDIR architecture 20 includes a supervisory controller 24 adapted to interface with a main controller 26 of the wheel loader 50. The supervisory controller 24 is at a supervisory control level of the hydraulic actuation system. For example, the supervisory controller 24 supervises and interfaces with a plurality of control nodes (e.g. control modules, control subsystems, etc.) that are at a node level of the FDIR architecture 20. The FDIR architecture 20 is configured such that all of the nodes report back through the supervisory controller 24. In certain embodiments, there is no direct cross communication between the nodes. Instead, the nodes interface vertically with the supervisory controller 24, which functions to coordinate operation of the various nodes. As shown at FIG. 1, the nodes can include a pump control node 28, a tilt cylinder control node 30, a lift cylinder control node 32, a boom suspension system control node 34, a tank control unit node 36 and one or more additional auxiliary nodes 38.

Figure 3:
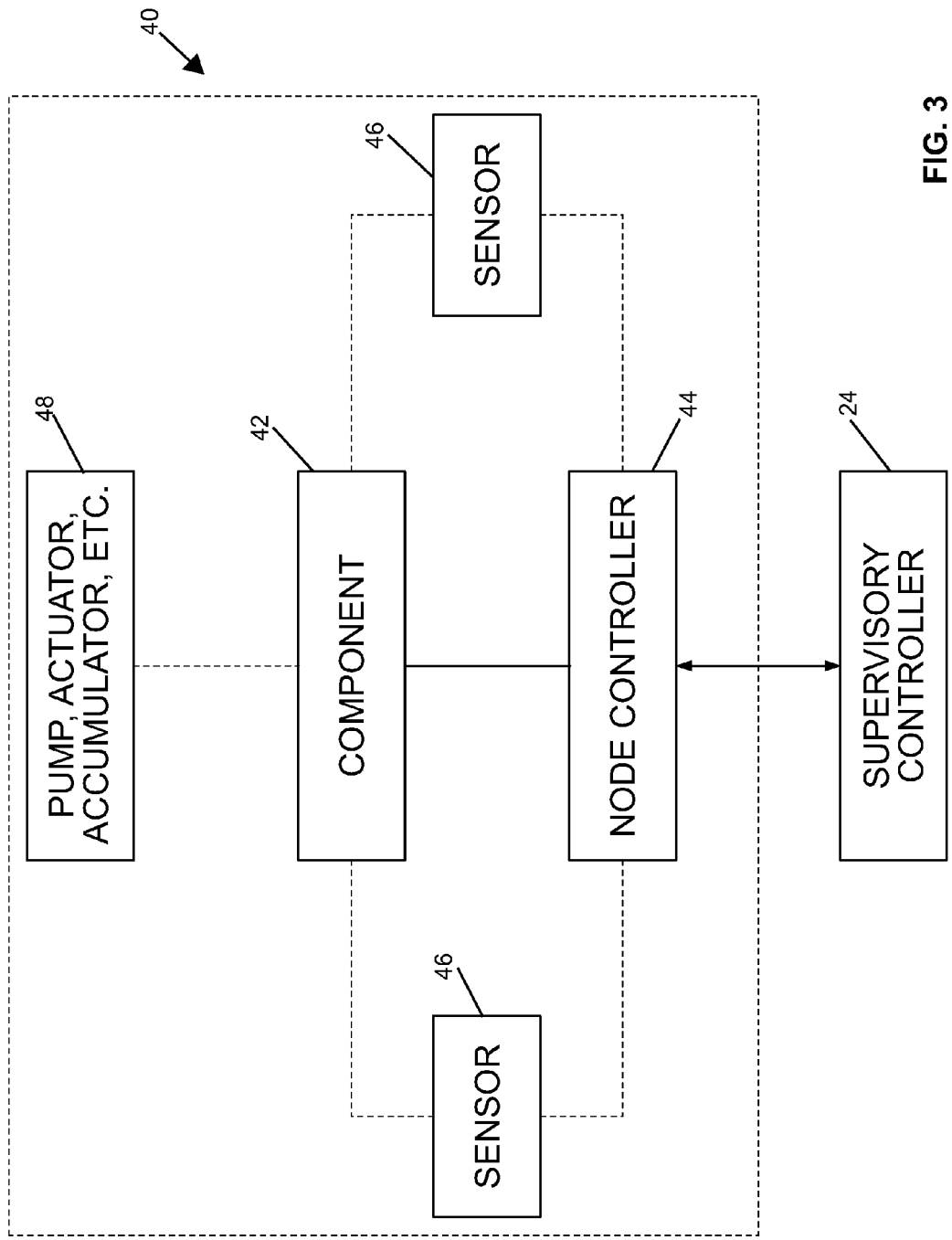
FIG. 3 is a schematic view of a node in accordance with the principles of the present disclosure.

Referring to FIG. 3, an example node 40 is shown. It will be appreciated that the node 40 can be representative of each of the nodes identified above. The node 40 includes one or more components 42 (e.g. valves such as two-stage spool valves, three-stage poppet valves, or other valves). Operation of the component 42 or components is controlled by a node controller 44. The node controller 44 interfaces with sensors 46 (e.g. pressure sensors, position sensors, etc.) that sense parameters indicative of the operation of the component 42. Based on information received from the sensors 46, the node controller 44 controls operation of the component 42 or components (e.g., with a closed loop control structure). In certain embodiments, the node controller 44 utilizes pulse with modulation control technology to control a position of the component 42. In operation, the node controller 44 receives commands (e.g. mode commands, operational demands, spool position demands, pressure demands, etc.) from the supervisory controller 24. In this way, the supervisory controller 24 ultimately controls and coordinates operation of the node 40. Concurrently, the node controller 44 communicates with the supervisory controller 24 by sending FDIR flags to the supervisory controller 24. The supervisory controller 24 keeps each of the nodes apprised of the FDIR of the other nodes.

For each of the nodes, the component 42 or components preferably control hydraulic flow to or from a system structure 48 such as a pump, an actuator (e.g. a hydraulic motor or a hydraulic cylinder) an accumulator or other hydraulic device. Information relating to hydraulic fluid flow through the component 42 or components, or to or from the system structure 48, can also be conveyed from the node controller 44 to the supervisory controller 24. Such information can be used by the supervisory controller 24 to allow the supervisory controller to detect faults, to isolate faults, and/or to reconfigure the system to address faults at the supervisory level.

The FDIR flags sent by the node controllers to the supervisory controller are indicative of whether a fault has been detected at a given node. The FDIR flag may indicate whether there or not the fault has been isolated at the node level. If the fault has not been isolated at the node level, the supervisory controller 24 can use data (e.g. flow data or information relating to faults detected at other nodes) to assist in isolating the fault at the supervisory level.

II. Example Vehicle for Application of FDIR Architecture

Figure 2:
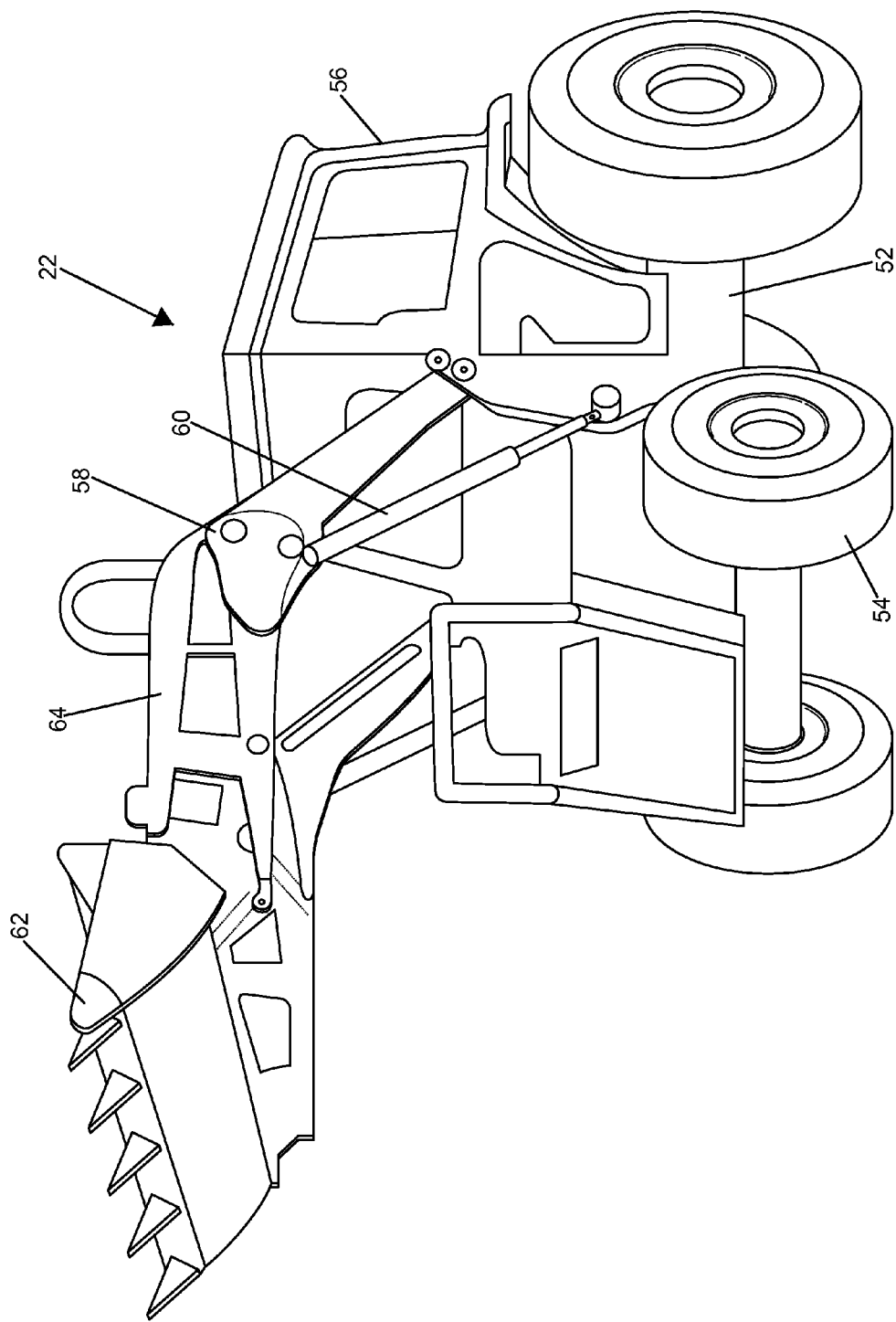
FIG. 2 shows a wheel loader to which the system architecture disclose here and can be applied.

FIG. 2 illustrates a wheel loader 50, which is an example of a type of construction vehicle to which aspects of the present disclosure can be applied. The wheel loader includes a chassis or frame 52 supported on wheels 54. A cab 56 is supported on the frame 52. A boom 58 is pivotally connected to the frame 52. A lift cylinder 60 is used to pivot the boom 58 upwardly and downwardly relative to the frame 52. A bucket 62 is pivotally mounted at the end of the boom 58. A tilt cylinder 64 is used to pivot the bucket 62 relative to the boom 58.

III. Example Architecture Schematic

Figure 4:
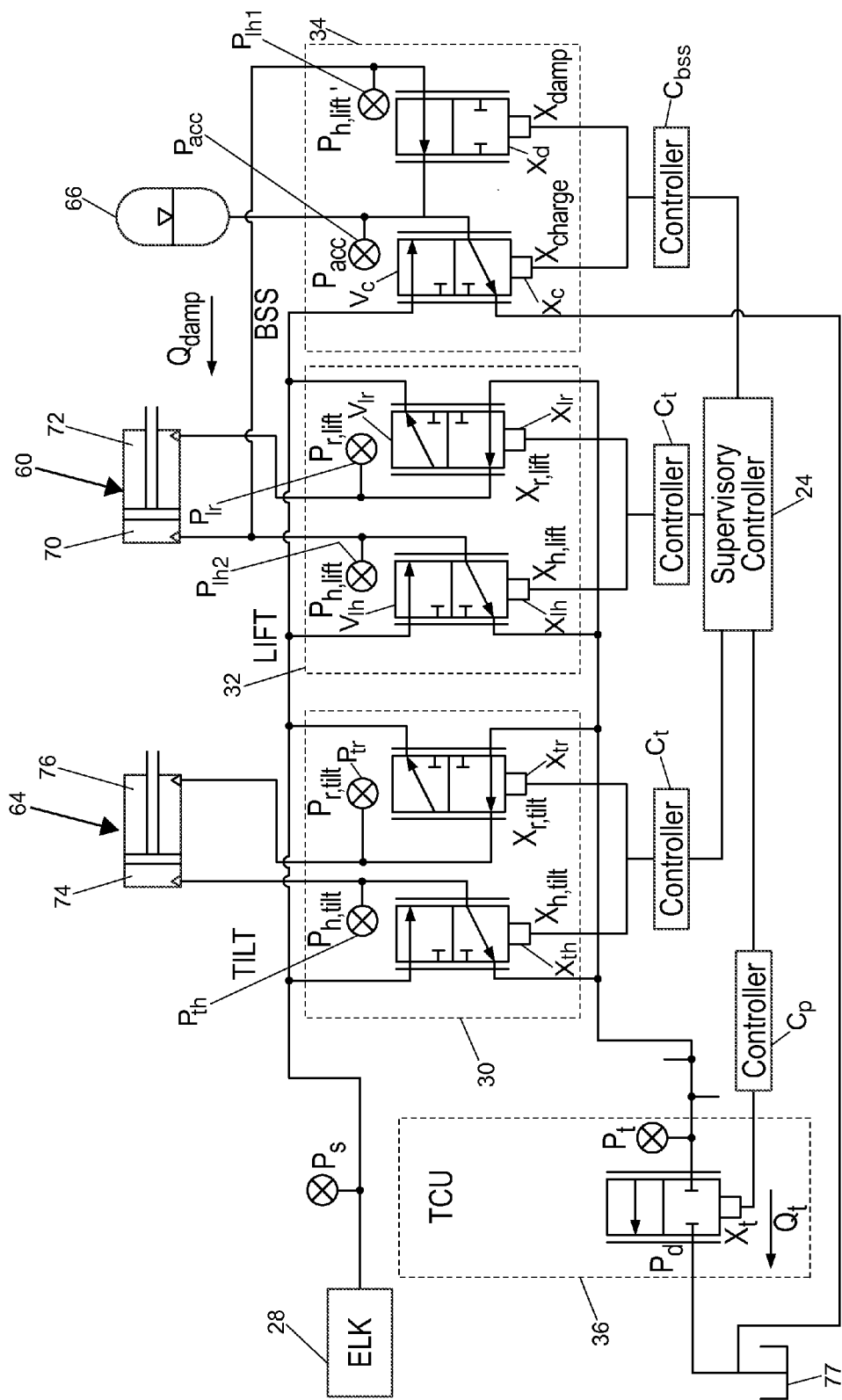
FIG. 4 is a diagram showing a fault detection, isolation and reconfiguration architecture in accordance with the principles of the present disclosure.
Figure 5:
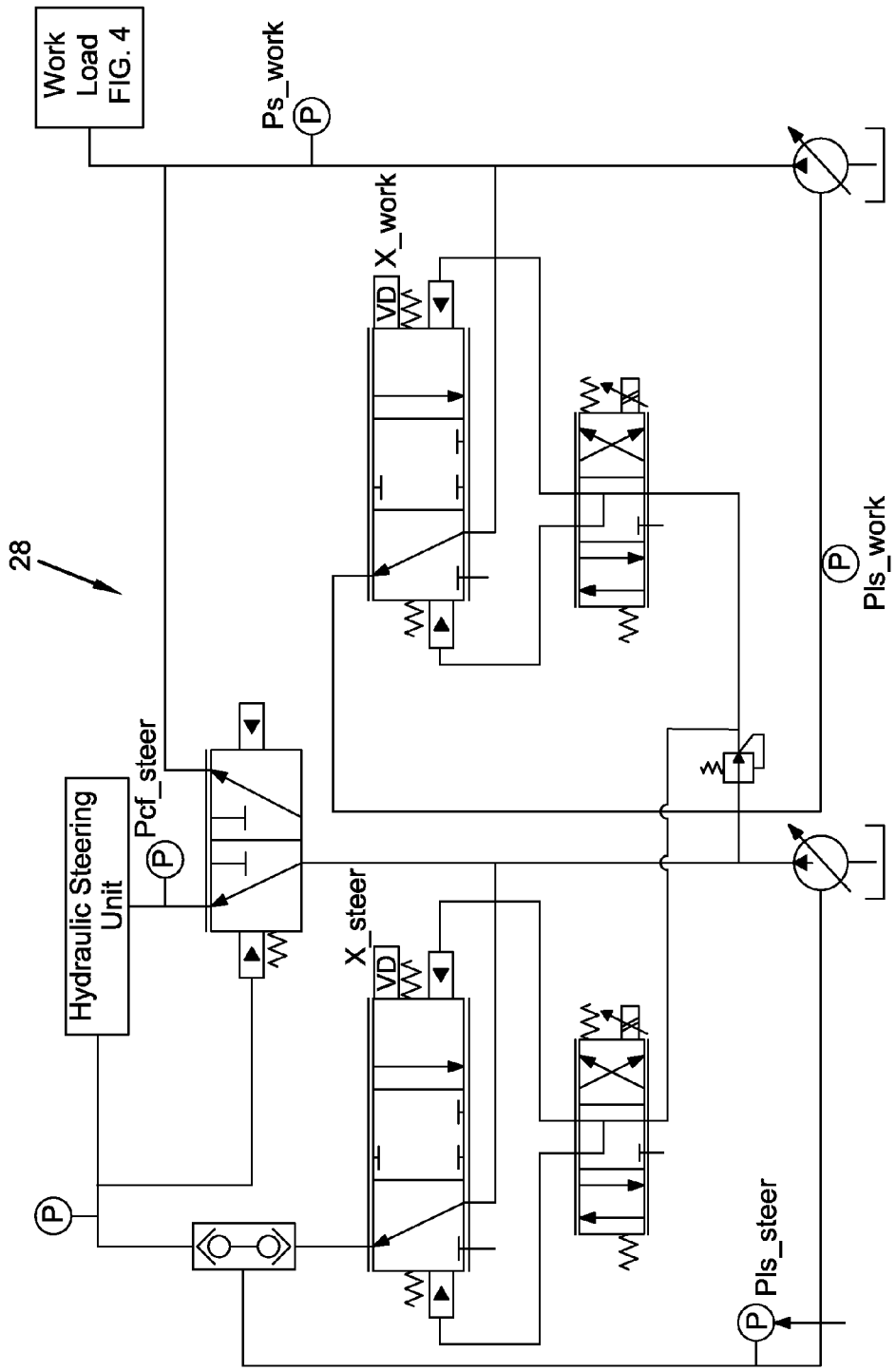
FIG. 5 is a steering node that is part of the schematic of FIG. 4.

FIG. 4 illustrates a schematic of system architecture suitable for use in controlling the hydraulic actuation system of the wheel loader 50. The architecture includes the supervisory controller 24 that interfaces with the pump control node 28, the tilt cylinder control node 30, the lift cylinder control node 32, the boom suspension system control node 34 and the tank control unit node 36 (auxiliary nodes are not shown). The pump control node 28 (shown in more detail at FIG. 5 and described at Section XV of this disclosure) controls the hydraulic fluid pressure and flow rate needed to satisfy the flow and pressure requirements of the tilt cylinder control node 30, the lift cylinder control node 32 and the boom suspension system control node 34. The tank control unit node 36 receives the hydraulic fluid flow discharged from the tilt cylinder control node 30, the lift cylinder control node 32 and the boom suspension system control node 34. The tilt cylinder control node 30 controls the hydraulic fluid flow provided to and from the tilt cylinder 64 of the wheel loader 50. The lift cylinder control node 32 controls the hydraulic fluid flow provided to and from the lift cylinder 60 of the wheel loader 50. The boom suspension system control node 34 controls the hydraulic fluid flow provided to and from an accumulator 66. The boom suspension system control node 34 also controls fluid communication between the accumulator 66 and the lift cylinder 60.

The tilt cylinder control node 30 is in fluid communication with the one or more pumps of the pump control node 28 and functions to selectively place a head side 74 or a rod side 76 of the tilt cylinder 64 and fluid communication with the pump or pumps. Similarly, the tilt cylinder control node 30 is in fluid communication with the system tank 77 (i.e., the system reservoir) through the tank control unit node 36 and functions to selectively place the head side 74 or rod side 76 of the tilt cylinder 64 and fluid communication with the tank 77.

The tilt cylinder control module 30 includes a head side flow control valve $V_{th}$ that selectively places the head side 74 of the tilt cylinder 64 in fluid communication with either the system pump/pumps or the system tank. The tilt cylinder control node 30 also includes a rod side flow control valve $V_{tr}$ that selectively places the rod side 76 of the tilt cylinder 64 in fluid communication with either the system pump/pumps or the system tank. Valve position sensors $X_{th}$ and $X_{tr}$ are provided for respectively sensing the spool positions (i.e., the sensors detect positions of valve spools within valve sleeves) of the head side flow control valve $V_{th}$ and the rod side flow control valve $V_{tr}$. Additionally, pressure sensors $P_{th}$ and $P_{tr}$ are provided for respectively sensing the head side and rod side pressures of the tilt cylinder 64. The tilt cylinder control node 30 also includes a component controller $C_t$ that controls operation of the valves $V_{th}$, $V_{tr}$ based on commands (e.g., mode, pressure or spool position demands, etc.) received from a supervisory controller 24 and feedback provided by the sensors of the node. The component controller $C_t$ also monitors the node for failure conditions and reports any detected failure conditions to the supervisory controller 24 as raised fault flags.

The lift cylinder control node 32 is in fluid communication with one or more pumps of the pump control node 28 and functions to selectively place the one or more pumps in fluid communication with a head side 70 or a rod side 72 of the lift cylinder 60. Similarly, the lift cylinder control node 32 is in fluid communication with the tank 77 through the tank control unit node 36 and is configured to selectively place the head side 70 and the rod side 72 of the boom cylinder 60 in fluid communication with the tank 77.

The lift cylinder control node 32 includes a head side flow control valve $V_{lh}$ and a rod side flow control valve $V_{lr}$. The head side flow control valve $V_{lh}$ is configured to selectively place the head side 70 of the boom cylinder 60 in fluid communication with either the one or more pumps of the pump control node 28 or the system tank 77. The rod side flow control valve $V_{lr}$ is configured to selectively place a rod side 72 of the boom cylinder 60 in fluid communication with either one of the system pumps or the system tank 77. The lift cylinder control mode 32 further includes a head side valve position sensor $X_{lh}$ for sensing a spool position of the head side valve $V_{lh}$ and a rod side valve position sensor $X_{lr}$ for sensing the spool position of the rod side flow control valve $V_{lr}$. The lift cylinder control node 32 also includes a pressure sensor $P_{lh2}$ for sensing the pressure of the head side 70 of the boom cylinder 60, and a pressure sensor $P_{lr}$ for sensing the hydraulic pressure at the rod side 72 of the boom cylinder 60. The lift cylinder control node 32 further includes a component level controller $C_l$ that interfaces with the various sensors of the lift cylinder control node 32. The component controller $C_l$ also interfaces with the supervisory controller 24. The component controller $C_l$ controls the operation of the valves $V_{lh}$, $V_{lr}$ based on demand signals (e.g., mode, pressure, spool position demands, etc.) sent to the component controller $C_l$ by the supervisory controller 24 and based on feedback provided by the sensors of the lift cylinder control node 32. The component controller $L_l$ also monitors the fault conditions that may arise within the lift cylinder control node 32 and reports such fault conditions to the supervisory controller 24 as raised fault flags.

The boom suspension system control node 34 is in fluid communication with the one or more pumps of the pump control node 28 and is configured to selectively place an accumulator 66 in fluid communication with the one or more pumps to charge the accumulator 66. The boom suspension system control node 34 can also place the accumulator 66 in fluid communication with the tank 77 and/or the head side 70 of the lift cylinder 60.

The boom suspension system control node 34 includes a charge valve $V_c$ and a damping valve $V_d$. The charge valve $V_c$ can be used to charge the accumulator 66 by placing the accumulator 66 in fluid communication with a pump of the pump control node 28. The damping valve $V_d$ is used to selectively place the accumulator 66 in fluid communication with a head side 70 of the boom cylinder 60. The boom suspension system control node 34 further includes a charge valve position sensor $X_c$ that senses the spool position of the charge valve $V_c$. The boom suspension system control node 34 also includes a damping valve position sensor $X_d$ that senses a position of the damping valve $V_d$. The boom suspension system control node 34 further includes a pressure sensor $P_a$ that senses a pressure of the accumulator 66, and a pressure sensor $P_{lh1}$ that senses the pressure at the head side 70 of the boom cylinder 60. The sensors of the boom suspension system control node 34 interface with a node controller $C_{bss}$ which provides node level control of the boom suspension system control node 34. The controller $C_{bss}$ interfaces with the supervisory controller 24 and reports fault conditions within the node to the supervisory controller 24 as raised fault flags. The controller sends operational commands (e.g., mode, pressure, spool position demands, etc.) to the valves.

The tank control unit node 36 includes a tank flow control valve $V_t$ that controls system flow to the system tank 77. The tank control unit node 36 also includes a pressure sensor $P_t$ that senses the pressure of the system tank 77 at a location upstream from the valve $V_t$. A position sensor $X_t$ senses a position of the valve $V_t$. A component controller $C_t$ is provided for controlling operation of the valve $V_t$. The component controller $C_t$ interfaces with the sensors of the mode and also interfaces with the supervisory controller 24. Operation of the valve $V_t$ is controlled by the component controller $C_t$ based on commands (e.g., mode, pressure, spool position demands, etc.) received from the supervisory controller 24 and feedback from the node sensors. The component controller $C_t$ monitors operation of the node and reports any failure conditions to the supervisory controller 24.

The FDIR architecture described above allows for fault detection at different levels. For example, faults can be detected at the sensor level, at the component level, at the intra-nodal level and at the inter-nodal (i.e. supervisory, system) level. The architecture also allows for fault isolation at the sensor level, at the component level, at the intra-nodal level and at the inter-nodal (i.e. supervisory, system) level. Moreover, the architecture allows for reconfiguration at any or all of the above levels.

IV. Parameter Mapping

Figure 6:
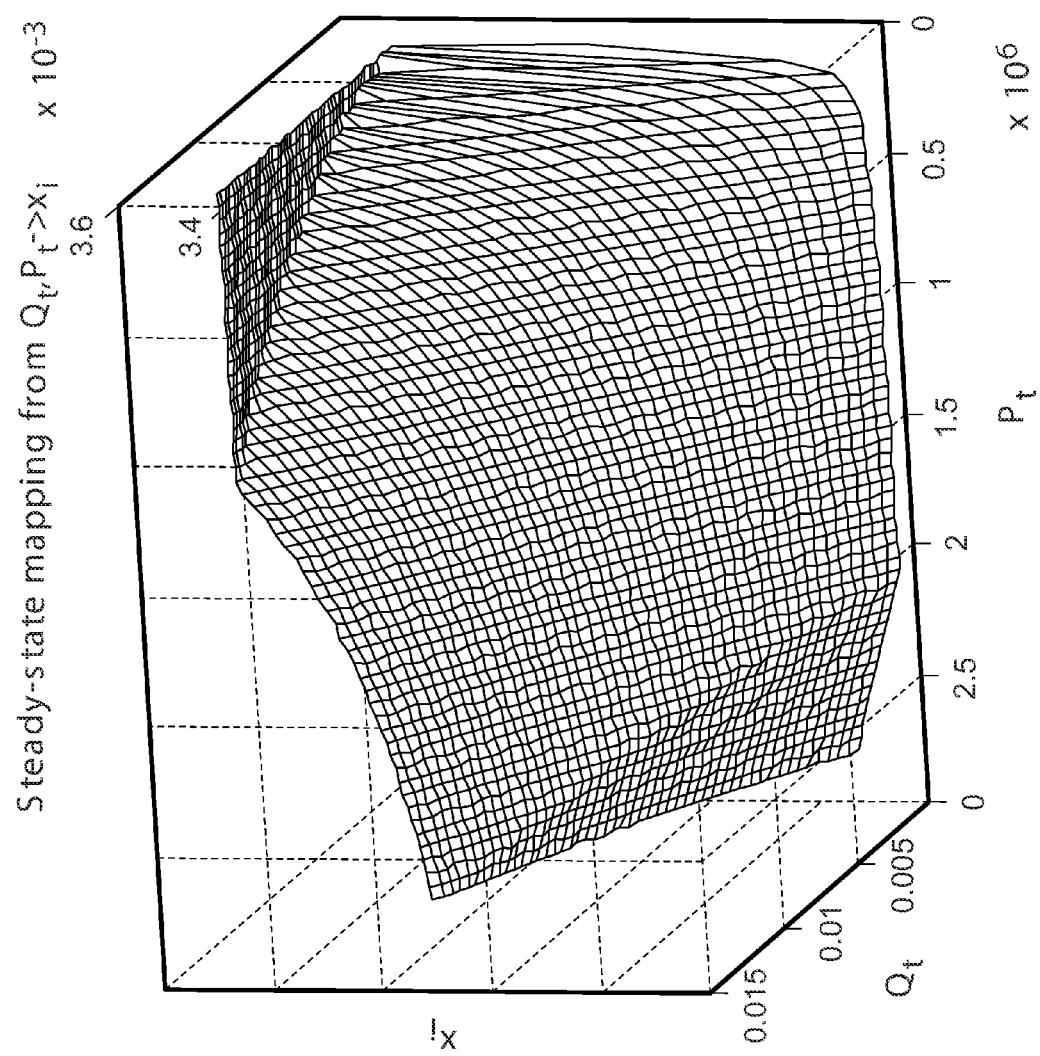
FIG. 6 is an example valve pressure map showing a mapping of flow pressure and spool position.
Figure 7:
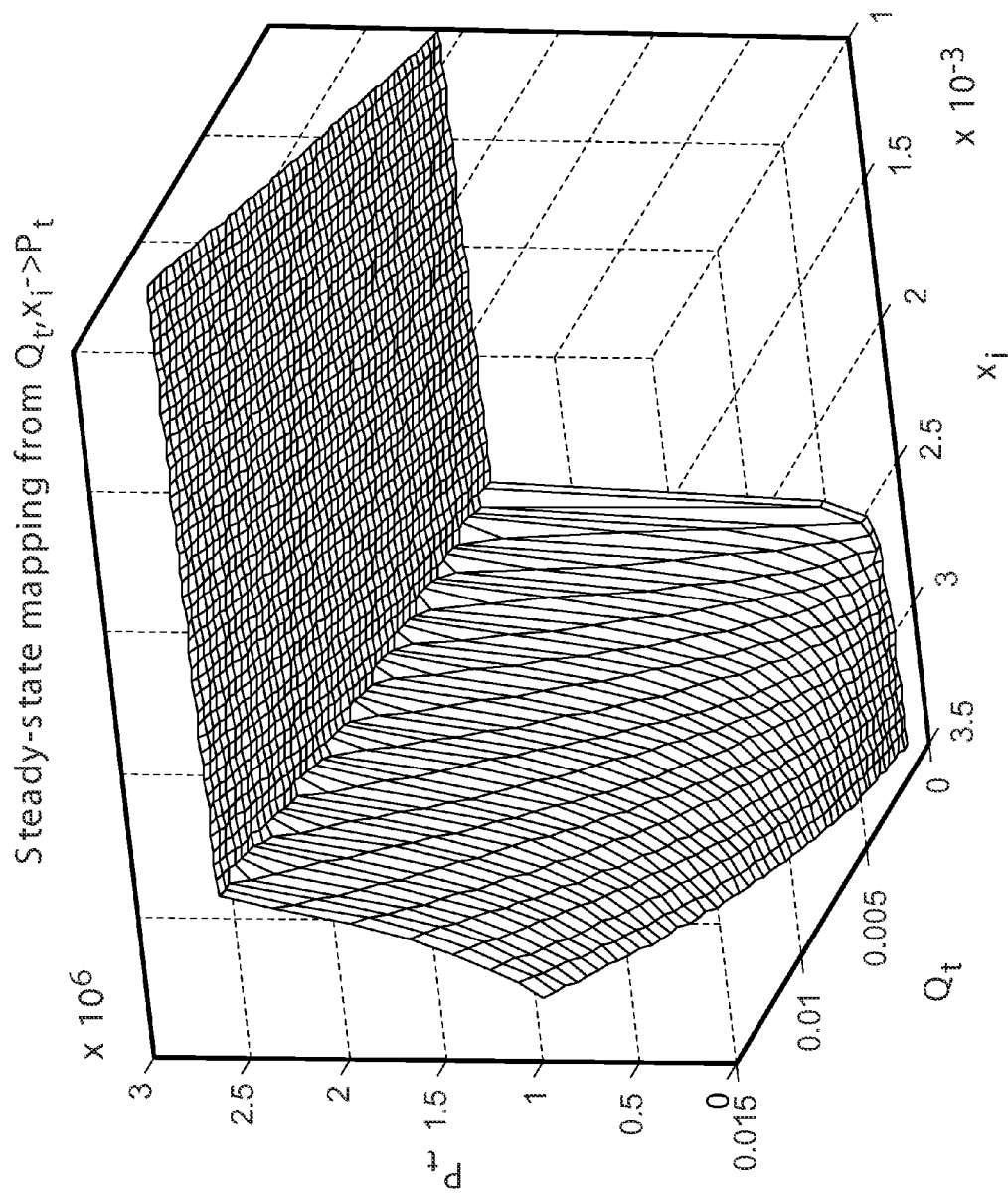
FIG. 7 is an example valve spool position map showing a mapping of flow, pressure and spool position.

Parameter maps can be created from empirical data or mathematical formulas. Parameter maps can be stored in memory at either the node or supervisory level and can be accessed by the supervisory controller or the node controllers as parameter information is needed. Parameter maps correlate data in a graphical form and can be used to estimate certain parameters based on other related parameters. For example, in the case of a valve, the parameters of flow, spool position (which indicates orifice size) and differential pressure across the valve can be correlated in flow maps used to estimate an unknown parameter from known parameters. A flow map for a valve is indicated by Q=map (P, X, α), where P is differential pressure across the valve, X is the valve spool position and α is an additional variable such as temperature. Based on the flow map, flow can be determined if the P, X and α are known. A pressure map for a valve is indicated by P=map (Q, X, α). An example pressure map is shown at FIG. 6. Based on the pressure map, pressure can be determined if Q, X and α are known. A spool position map is indicated by X=map (Q, P, α). An example spool position map is shown at FIG. 7. Based on the spool position map, spool position can be determined if Q, X and α are known.

Other maps can also be used. For example, spool velocity maps define a relationship between valve spool speed and the current of a pulse width modulation signal used to control actuation of a solenoid used to axially move the spool within the bore of the valve. Position maps can also define a relationship between the position of a valve spool and the magnitude of a position demand signal used to control movement of the spool. Pressure maps can also define a relationship between the pressure differential across a spool and the magnitude of a pressure demand signal used to control movement of the spool.

V. Sensor Level Fault Detection

Figure 8:
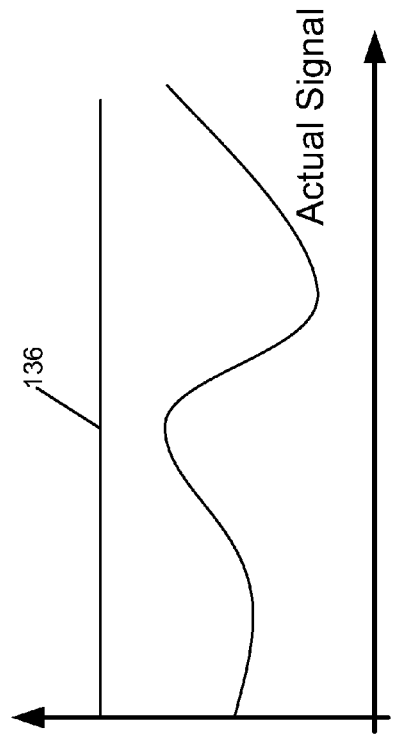
FIGS. 8-11 show various sensor level faults.
Figure 9:
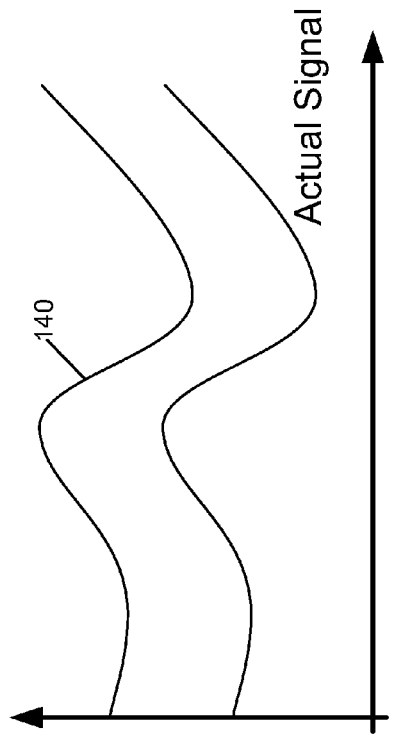
Figure 10:
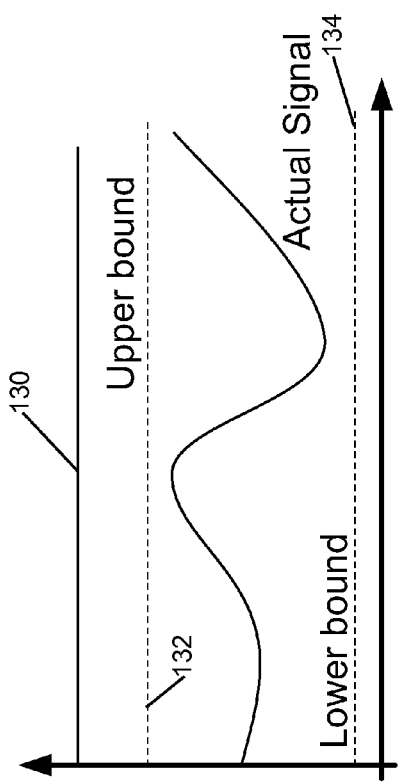
Figure 11:
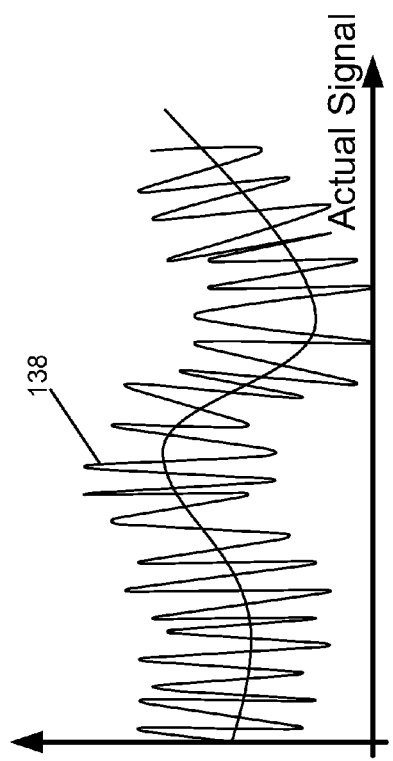

Certain errors can be detected at the sensor level. Such errors are typically not dependent upon variable parameters that require independent monitoring. For example, such errors can be determined by comparing sensor readings to certain preset or pre-established parameters, ranges or other criteria. One example of this type of sensor fault is shown at FIG. 8 where a sensor signal 130 is shown outside the pre-defined range having an upper boundary 132 an a lower boundary 134. Another example is shown at FIG. 9 where the sensor generates a stationary signal for a predetermined amount of time under circumstances where the sensor signal should be changing. FIG. 10 shows a further fault condition where the sensor generates a predetermined amount of noise 138 corresponding to the signal. A further example of a sensor level fault is where the sensor fails to generate any signal at all. FIG. 11 is representative of a condition where a sensor signal 140 tracks or follows an actual signal 142, but has the wrong magnitude. As long as the sensor signal 140 stays within the predefined range of the sensor, this type of error can be difficult to detect. In this regard, certain higher level of detection techniques disclosed herein can be used to detect such a fault.

VI. Component Level Fault Detection

One example of fault detection that takes place at the component level is fault detection based on closed loop position control of a valve. In this regard, for a given valve, it is possible to estimate the spool position based on the spool position demand commanded from the supervisory controller. For example, the spool position can be estimated by using empirical look-up tables, position mapping, or a second order transfer function parameter. The estimated spool position can be compared to the spool position indicated by the position sensor corresponding to the spool. If the estimated spool position varies from the sensed spool position by at least predetermined amount for a predetermined time, an error flag can be raised. FIG. 12 is a schematic view showing this fault detection strategy. As shown in FIG. 12, a position closed loop transfer function 150 is used to provide a position estimate 152 based on a position demand 154 provided by the supervisory controller. A sensed position value 156 is subtracted from the estimated position value 152 to provide a residual value 158. If the residual value exceeds a predetermined amount for a predetermined time window, an error flag is raised at the respective node and is conveyed to the supervisory controller. It will be appreciated that the above fault detection technique can be used at the component level for any of the nodes 28, 30, 32, 34 and 36 depicted at FIG. 4. For example, the fault detection technique can be used to check the functionality of the position sensor $X_{th}$ that controls the position of the spool of the head side flow control valve $V_{th}$ of the tilt cylinder control node 30. A demand from the supervisory controller is received by the component controller $C_t$ and the component controller $C_t$, using conventional pulse width modular control logic, generates a signal for controlling the position of the spool of the valve $V_{th}$. Through position mapping, empirical data, lookup tables or other means, it is possible to estimate the position of the spool of the valve $V_{th}$ based on a characteristic of the position demand commanded by the supervisory controller. This estimated position is compared to the position indicated by the position sensor $X_{th}$. If the estimated position varies from the sensed position by a predetermined amount for a predetermined time window, an error flag is raised.

Another component level fault detection technique is based on closed loop pressure control. Under this fault detection strategy, a pressure demand from the supervisory controller is used to estimate a pressure for a given sensor. The pressure can be estimated using pressure mapping techniques, empirical data, lookup tables or formulas such as a second order pressure control transfer function. The estimated pressure is then compared to a pressure sensed by the given sensor. If the estimated pressure value varies from the sensed pressure value by a predetermined amount for a predetermined time window, a fault flag can be raised. FIG. 13 is a schematic illustrating this type of technique for detecting a fault. Referring to FIG. 13, a closed loop pressure control transfer function 160 is used to estimate a pressure value 162 for a given sensor based on a pressure demand 164 commanded by the supervisory controller. A sensed pressure value 166 is subtracted from the estimated pressure value 162 to generate a residual value 168. If the residual value 168 exceeds a predetermined amount for a predetermined time window, a fault flag is generated. It will be appreciated that this type of fault detection strategy can be used to monitor the operation of all of the pressure sensors provided in the system of FIG. 4. By way of example, in operation of the tilt cylinder control node 30, the supervisory controller can send a pressure demand to the component controller $C_t$. Based on the value of the pressure demand, the component controller $C_t$ uses pulse width modulation control logic to control the operation of the valve $V_{th}$ so as to achieve an estimated pressure value at the head side 74 of the tilt cylinder 64. It will be appreciated that the estimated pressure value can be estimated based on pressure mapping, empirical data, lookup tables or formulas such as a closed loop pressure control transfer function. The estimated pressure value is compared to the sensed pressure reading generated by the pressure sensor $P_{th}$. If the sensed pressure value differs from the estimated pressure value by a predetermined amount for a predetermined amount of time, a fault flag is raised by the component controller $C_t$ and forwarded to the supervisory controller.

A further example of fault detection at the component level relates to fault detection based on the spool velocity of a spool valve. It will be appreciated that this type of fault detection can be used in any of the valves of the system shown at FIG. 4. Using this technique, a velocity map is pre-generated that defines a relationship between the spool velocity and the pulse width modulation (PWM) signal (e.g., the current of the signal) generated by the component controller being used to control operation of the valve at issue. The velocity map can take into consideration variables such as temperature and other factors. By having a spool velocity to PWM signal map stored in memory and readily accessible, it is possible to estimate the velocity of the spool based on the magnitude of the PWM signal. The estimated velocity is then compared to the calculated spool velocity based on the readings provided by the position sensor of the spool. If the estimated velocity varies from the calculated velocity by a predetermined amount/threshold for a predetermined time window, a fault flag is raised by the component controller and forwarded to the supervisory controller.

VII. Subsystem/Node Level Fault Detection

One example approach for subsystems/node level fault detection is to estimate a "virtual" or reference flow value by leveraging an analytical redundancy, and then comparing the reference flow value to a sensed flow value. For example, the meter-in flow of an actuator can be used to determine/estimate the meter-out flow of the same actuator. This type of fault detection strategy can be used to compare flows passing through the valves $V_{th}$ and $V_{tr}$ of the tilt cylinder control node 30 as the tilt cylinder 64 is actuated. This type of control strategy can also be used to compare flows passing through the valves $V_{lh}$ and $V_{lr}$ of the lift cylinder control node 32 as the lift cylinder 60 is actuated. The meter-out flow of an actuator can also be used determine a reference flow related to the meter-in flow of the same actuator. Additionally, for an accumulator, the accumulator pressure and the rate of change of the accumulator pressure can be used to provide a reference flow that under normal circumstances is equal to a sensed flow passing through the a valve controlling flow into and out of the accumulator.

Subsystem level fault detection is advantageous because any type of single sensor failure can be detected in real time to significantly improve the system safety and dependability. This type of sensing allows sensor faults that are difficult to sense (e.g., dynamic offset in which the failed sensor is able to track the actual signal), to be detected in real time. Moreover, by combining other techniques (e.g., signal processing, sensor level fault detection, component level fault detection, subsystem level fault detection and system level fault detection), more than one sensor failure can be detected.

A. Fault Detection and Reconfiguration Achieved by Using Meter-in Flows and Meter-Out Flows of the Same Actuator as Reference Parameters For certain hydraulic actuators, such as hydraulic motors and hydraulic cylinders having equal sized piston rods on both sides of the piston head, the flow entering the actuator will equal the flow exiting the actuator. Thus, if a single meter-in valve provides all the flow to the actuator and a single meter-out valve receives all of the flow out of the actuator, the flows passing through the meter-in valve and the meter-out valve will be equal to one another. In this way, the actuator defines an operational relationship between the meter-in valve and the meter-out valve. A flow map (Q1=map(P1, X1, $\alpha$1)) for the meter-in valve can be used to calculate the sensed flow through the meter-in valve. The flow through the meter-out valve can also be calculated by using a flow map (Q2=map(P2, X2, $\alpha$2)) corresponding to the meter out valve. Since the meter-out valve and the meter-in valves are both connected to the same actuator, their calculated/estimated flows should not vary from one another by more than a predetermined threshold. Thus, the Q2 is a reference flow for Q1, and Q1 is a reference flow for Q2. Thus, if Q1 and Q2 differ by a predetermined threshold, this indicates a sensor failure and a fault flag is raised.

If a reconfiguration for a faulty sensor is needed, the flow determined for the related valve having operable sensors can be used to provide an estimated value for controlling operation of the valve with the faulty sensor. For example, if a pressure sensor corresponding to the meter-in valve fails, the reference flow Q2 calculated from the corresponding meter-out valve can be substituted into the flow map for the meter-in valve ($P1_{est}$=map(Q2, X1, $\alpha$1)) to provide an estimated pressure value $P1_{est}$ that can be used to operate the meter-in valve. Specifically, the estimated pressure value $P1_{est}$ can be substituted into a closed loop control algorithm for controlling operation of the meter-in valve. In this way, the faulty sensor can be removed from the system while the system continues to operate. Similarly, if the position sensor of the meter-in valve fails, the reference flow Q2 value calculated from the meter-out valve can be substituted into the flow map for the meter-in valve ($X1_{est}$=map (Q2, P1, $\alpha$1)) and used to calculate estimated position values $X1_{est}$ for controlling operation of the meter-in valve. Specifically, the estimated pressure value $X1_{est}$ can be substituted into a closed loop control algorithm for controlling operation of the meter-in valve. In a similar way, if the meter-out valve is faulty, reference flow values from the meter-in valve can be used to generate estimated sensor readings that can be substituted for the faulty sensors. In a reconfiguration situation, a Smith Predictor can be used to remove oscillation due to time delay associated with the time needed to make the calculations needed to derive the estimated sensor value.

Referring to FIG. 4, both the head side valve $V_{th}$ and the rod side valve $V_{tr}$ control fluid flow through the tilt cylinder 64. Because the piston includes a piston head with a rod only at one side, the flow entering the cylinder does not equal the flow exiting the cylinder. Instead, the flow $Q_r$ entering or exiting the rod side 74 of the cylinder equals the flow $Q_h$ entering or exiting the head side 76 of the cylinder multiplied by the ratio of the head side piston area $A_h$ to the rod side piston area $A_r$. The rod side piston area $A_r$ equals the head side piston $A_h$ area minus the cross-sectional area of the piston rod. The relationship between the rod side flow $Q_r$ and the head side flow of $Q_h$ provides a means for fault detection. The estimated flow Q1 through the valve $V_{th}$ equals the head side flow $Q_h$ and the estimated flow across the valve$_{tr}$ Q2 equals the rod side flow $Q_r$. This establishes a mathematical relationship between the flows Q1 and Q2. Specifically, Q1 should equal Q2 multiplied by $A_h/A_r$. Thus, $Q2 \times A_h/A_r$ is a reference flow for Q1 and $Q1 \times A_r/A_h$ is a reference flow for Q2. If Q1 is not within a predetermined threshold of $Q2 \times A_h/A_r$, then a fault exists and a fault flag should be raised. As described above, to reconfigure the system, a reference flow value corresponding to an operable one of the valves $V_{th}$ and $V_{tr}$ can be used to estimate sensed values for a failed sensor in a faulty one of the valves $V_{th}$ and $V_{tr}$. This allows real time reconfiguration of the system in which the valves can be continued to operate with defective sensors placed offline and replaced with virtual sensors generated from redundant/overlapping flow relationships.

B. Accumulator Flow as a Reference Parameter

For accumulators, the accumulator pressure and accumulator pressure rate of change determine the gas dynamics in the chamber, which is related to the accumulator flow rate. Thus, an accumulator flow map can be generated based on the pressure and the rate of pressure change of the accumulator. This being the case, if the pressure and pressure rate of change of the accumulator are known, the flow rate input into or output from the accumulator can be readily determined from the accumulator flow map. If, at a given point in time, only one valve is used to control the flow into or out of an accumulator, the accumulator flow determined from the accumulator flow map can be used as a reference flow equal to the sensed flow passing through the control valve. This relationship can be used in the boom suspension system control node 34 to provide for subsystem level fault detection and reconfiguration within the node 34. This type of subsystem level fault detection is outlined at FIG. 14.

As shown at FIG. 14, two flows Q1 and Q2 are determined. Depending on the operating state of the node 32, the flow Q1 corresponds to the calculated flow through the valve $V_c$ or the valve $V_d$. Q2 corresponds to the calculated accumulator flow. Flow map f1 corresponds to valve $V_c$ and is used to calculate Q1 when the valve $V_c$ is in a position where the accumulator 66 is connected to the tank 77. Flow map f2 corresponds to valve $V_c$ and is used to calculate Q1 when the valve $V_c$ is in a position where the accumulator 66 is connected to the pump node 36. Flow map f3 corresponds to valve $V_d$ and is used to calculate Q1 when the valve $V_d$ is in a position where the accumulator 66 is connected to the head side of the lift cylinder 60. Flow map f4 is a flow map for the accumulator 66 and is used to calculate Q2. If the difference between Q1 and Q2 exceeds a predetermined flow threshold level over a predetermined time period, then a sensor fault is detected in the boom suspension system control node 34.

Once the four flow maps described above have been established, redundancies have provided that allow multiple flow calculations that can be compared to determine if a fault condition has taken place. For example, if the charge valve $V_c$ is controlling flow to or from the accumulator, then the calculated flow across the valve $V_c$ as determined by the appropriate flow map f1 or f2 should equal the calculated flow exiting or entering the accumulator as determined by the accumulator flow map f4. If the two flows Q1 and Q2 do not match within a predetermined threshold for a predetermined period of time, then a fault flag is generated. The flow maps f1 and f2 are used to estimate the flow Q1 across the charge valve $V_c$ depending upon the position of the spool (e.g., depending upon whether the accumulator is coupled to the pressure side or the tank side). The flow map f3 is used to estimate the flow Q1 when the boom suspension system is in the boom suspension system mode in which the damping valve $V_d$ places the accumulator in fluid communication with the head side 70 of the lift cylinder 60. Q2 is always calculated by the accumulator flow map f4. It will be appreciated that when a fault is detected using the above-process, the source of the fault can be any number of different sensors within the system. The architecture of the present system allows various operational parameters to be cross-referenced to isolate the fault to a particular sensor.

Similar to previously described embodiments, Q1 is a reference flow for Q2 and Q2 is a reference flow for Q1. Thus, once a fault has been isolated to a particular position sensor of one of the valves $V_c$, $V_d$, the flow Q2 can be substituted into the spool position map of the faulty valve to calculate an estimated spool position value that can be substituted into the closed loop control algorithm for the faulty valve to allow the faulty valve to operate in a reconfigured state in which the faulty sensor has been taken off line. In other embodiments, the system can be reconfigured by stopping movement of the valves $V_c$, $V_d$.

Figures 15, 16:
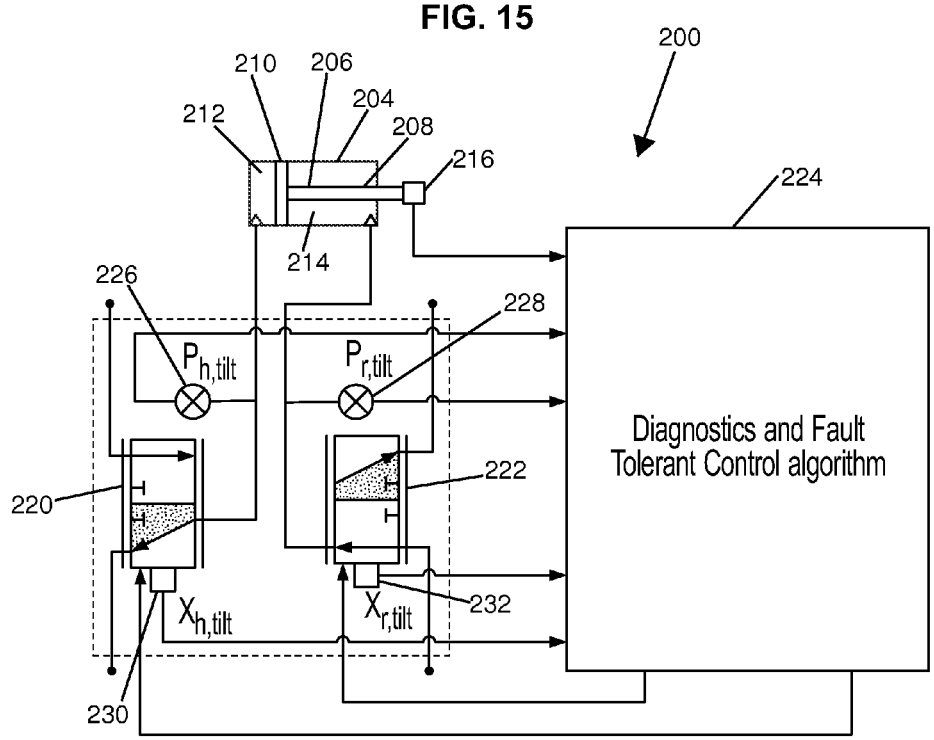
FIG. 15 is an example fault detection, fault identification and reconfiguration matrix.
FIG. 16 is a schematic view showing an example lift cylinder control node where the lift cylinder is equipped with a rod sensor.

If the accumulator 66 is piston style accumulator, a third redundancy in the form of a third flow calculation Q3 can be made based on the piston velocity (assuming a piston sensor is provided). Q3 equals the flow exiting or entering the accumulator. Under normal operating conditions Q1=Q2=Q3. FIG. 15 is a fault isolation and reconfiguration chart for the boom suspension system node 34 when the accumulator 66 is a piston style accumulator.

VIII. System Level Fault Detection

It will be appreciated that if the flow rate from each branch of a bigger flow is known, adding the branch flows together will provide a reference flow value that is representative of the total flow. For example, referring to FIG. 4, the total flow passing through the tank valve $V_t$ equals the sum of the branch flows dispensed from the tilt cylinder control node 30 and the lift cylinder control node 32 toward the tank 77. It will be appreciated that using flow maps of the type described above, the flows through any one of the valves can be estimated. To identify a fault condition, a first flow Q1 through the tank valve $V_t$ can be determined through flow mapping. Also, flows Q2 and Q3 that respectively correspond to the flows dispensed from the tilt cylinder control node 30 and the lift cylinder control node 32 can also be determined using corresponding flow maps. Under normal circumstances, the sum of the flows Q2, Q3 should equal the total flow Q1 passing through the tank valve $V_t$. However, if the sum of the flows Q2, Q3 are not within a predetermined threshold of the total flow Q1 passing through the tank valve $V_t$, a fault flag is raised.

It will be appreciated that (Q2+Q3) is a reference flow for Q1, (Q1−Q2) is a reference flow for Q3, and (Q1−Q3) is a reference flow for Q2. Thus, once a fault has been isolated to a particular sensor of one of the valves respective reference flow can be substituted into the spool position map or pressure map of the faulty valve to calculate an estimated spool position value or pressure value that can be substituted into the closed loop control algorithm for the faulty valve to allow the faulty valve to operate in a reconfigured state in which the faulty sensor has been taken off line.

Isolation for this type of fault can be done on the supervisory level using a matrix analysis approach. For example, if the tank control node 36, the lift cylinder control node 32 and the tilt cylinder control node 30 all report un-isolated faults to the supervisory level, then the fault is a tank pressure sensor. Also, if the tank control node 36 and the lift cylinder control node 32 report un-isolated faults and the tilt cylinder control node 30 reports no fault, then the fault can be isolated to the lift cylinder control node 32.

IX. Fault Detection, Isolation and Reconfiguration of an Electrohydraulic System with Sensing Cylinder FIG. 16 shows a fault isolation architecture 200 in accordance with the principles of the present disclosure. The architecture 200 is adapted for controlling actuation of a hydraulic actuator 202. The hydraulic actuator includes a cylinder 204 and a piston 206 reciprocally mounted within the cylinder 204. The piston 206 includes a piston rod 208 and a piston head 210. The cylinder 204 defines a head side 212 and a rod side 214. The architecture 200 includes a sensor 216 for detecting a velocity of the piston 206. It will be appreciated that the sensor 216 can be a position sensor or a speed sensor. The architecture also includes valves for controlling actuation of the actuator 202. The valves are depicted as including a head side valve 220 fluidly connected to the head side 212 of the actuation device 202 and a rod side valve 222 fluidly connected to the rod side 214 of the actuator 202. The architecture 200 also includes a controller 224 capable of operating a diagnostics and fault control algorithm. The controller 224 interfaces with a head side pressure sensor 226, a rod side pressure sensor 228, a head side valve position sensor 230 and a rod side valve position sensor 232. The controller 224 has access to predefined flow maps corresponding to the valves 220, 222. A flow Q1 through the head side valve 220 can be determined by the controller 224 through the use of a flow map for valve 220. Similarly, a flow Q2 that is an estimate of the flow across the rod side valve 222 can be determined by a flow map of the valve 222. Since the valves 220, 222 are both fluidly coupled to the same actuator 202, a dependent relationship is defined between the flows Q1 and Q2. For example, the flow Q1 through the valve 220 equals the flow entering or exiting the head side 212 of the cylinder 204, and the flow Q2 passing through the valve 222 equals the flow exiting or entering the rod side 214 of the cylinder 204. Because the head side has a larger active piston area than the rod side, the flow entering or exiting the piston side 212 of the cylinder 204 is equal to the flow entering or exiting the piston side 214 of the cylinder 204 times the ratio of the active piston area $A_h$ at the head side of the cylinder 204 to the active piston area $A_r$ at the rod side 214 of the cylinder 204. This being the case, the flow Q1 equals Q2 multiplied by $A_h$ divided by $A_r$. Thus, the relationship determined by the actuator 210 creates a redundancy that can be used to detect faults. Specifically, if Q1 and Q2×$A_h$/$A_r$ differ from one another by more than a predetermined threshold, a fault flag is raised.

The system architecture 200 of FIG. 16 can also be used to provide three redundancies. Specifically, the sensor 216 can be used to calculate a velocity $V_{cyl1}$ of the piston 206. Also, the mapped flow of the head side valve 220 can be used to estimate a second velocity $V_{cyl2}$ of the piston 206. $V_{cyl2}$ equals the mapped flow $Q_h$ through the head cylinder 220 divided by the head side piston area $A_h$. A third velocity estimate $V_{cyl3}$ can be determined based on the mapped flow $Q_r$ for the rod side cylinder 222. The third velocity estimate $V_{cyl3}$ for the cylinder equals $Q_r$ divided by $A_r$. If any of these cylinder velocity values $V_{cyl1}$, $V_{cyl2}$ and $V_{cyl3}$ is not equal to the others within a predetermined threshold, then an error flag is raised.

FIG. 17 shows a matrix for isolating certain fault conditions. For example, case 1 indicates that the cylinder sensor 216 has failed. Also, case 2 indicates that either the head side pressure sensor 226 or the head side valve position sensor 230 have failed, case three indicates that either the rod side pressure sensor 228 or the rod side position sensor 232 has failed. Case four indicates that more than one sensor has failed. Case five indicates no faults have occurred.

The redundancies created by the overlapping relationships also provide a means for allowing the system to be reconfigured (see FIG. 18) to isolate the failed sensor from the system. Specifically, the faulty sensor can be taken offline and estimated values derived from the redundancies can be used in place of the off-line sensor. For case 1, the reconfiguration involves supporting the cylinder sensor value in the supervisory control. In case two, if the head side pressure sensor 26 is faulty, it can be taken offline and estimated value $P_{hest}$ can be used to control operation of the valve 220. $P_{hest}$ can be derived by substituting an estimated flow value $Q_{est}$ and the position sensor value $X_h$ into the flow map for the valve 220. If the sensor 230 is faulty, then it can be taken offline and estimated position value $X_{hest}$ can be used to control operation of the valve 220. The estimated position value $X_{hest}$ can be derived from the flow map for the valve 220 where an estimated flow $Q_{est}$ and the reading from the pressure sensor 226 are used to derive the estimated value $X_{hest}$ from the flow map. It is noted that the estimated flow $Q_{est}$ can be retrieved from either the $V_{cyl1}$ or $V_{cyl3}$ values. If the rod side pressure sensor 228 fails, an estimated pressure $P_{rest}$ can be used to control operation of the valve 222. It will be appreciated that the estimated pressure value $P_{rest}$ will be derived from a flow map using an estimated flow $Q_{est}$ and the position value generated by the rod side position sensor 232. Similarly, if the rod side position sensor 232 is faulty, it can be taken offline and estimated position $X_{rest}$ can be used to control the valve 222. The estimated position $X_{rest}$ can be derived from a flow map using an estimated flow $Q_{est}$ and a pressure value sensed by the rod side pressure sensor 228. In case three, the estimated flow $Q_{est}$ can be retrieved from the $V_{cyl1}$ and/or the $V_{cyl2}$ values.

In case four, the reconfiguration involves going to a fail safe configuration. In case five, reconfiguration is not applicable since no faults have been detected.

X. Closed Loop Multi-Stage Valve Control and Fault Isolation

FIG. 19 shows a closed looped pressure dictated control architecture for a multistage valve. An example valve 300 is shown at FIG. 20. The valve includes a pilot stage 302 an intermediate stage 304 and a main stage 306. The closed loop control architecture of FIG. 19 has a cascaded configuration in which an inner control loop 308 provides spool position control while an outer control loop 310 provides pressure control. Looking to FIG. 19, the supervisory controller provides a pressure demand 312 to a component controller at a node. At the component controller, an estimated pressure value derived from the demand signal is compared to a sensed pressure value 314. If the sensed pressure value and the estimated pressure value are different, the component controller generates a position demand signal 316. From the position demand signal 316, an estimated position is generated, which is compared to a sensed spool position signal 318. If the estimated spool position is different from the sensed spool position, the component controller generates a PWM signal which causes movement of a spool 322 at the intermediate stage 304. The sensed spool position value 318 is generated by a spool position sensor 324 at the spool 322. Movement of the spool 322 causes adjustment of the main stage 306 to alter the sensed pressure 314. The sensed pressure 314 is sensed by a pressure sensor 326 at the main stage 306.

If the estimated position value 316 varies from the sensed position value 318 by an amount in excess of a threshold for a predetermined length of time, an error flag is raised. Similarly, if the estimated pressure value varies from the sensed pressure value 314 by an amount that exceeds a threshold for a predetermined amount of time, an error flag is raised. It will be appreciated that a fault in the position sensor 324 will cause a fault flag to be raised with respect to the pressure sensor 326. In contrast, the pressure sensor 326 can be faulty without causing a fault to be raised with respect to the position sensor 318. FIG. 21 is a fault isolation matrix for use in isolating the source of a fault corresponding to the closed control architecture 301 of FIG. 19. In the matrix 330, R1 represents the fault status of the position sensor 324 and R2 represents the fault status of the pressure sensor 326. As shown in the matrix, if R1 and R2 are both off, no fault has been detected. However, if R1 is off and R2 is on, the fault can be isolated to the pressure sensor 326. If both R1 and R2 are on, this is indicative of a position sensor fault.

XI. Fault Detection Matrix Strategies

FIG. 22 is a fault isolation matrix for the boom suspension system control node 34. Referring to the fault isolation matrix, Rs1 corresponds to a sensor level fault for the position sensor $X_c$; Rs2 corresponds to a system level fault for the pressure sensor $P_{acc}$; Rs3 corresponds to a system level fault for the sensor $X_d$; Rs4 corresponds to a system level fault for the sensor $P_{th1}$; Rc1 corresponds to a component level fault for the sensor $X_c$; Rc2 corresponds to a component level fault for the sensor $P_{acc}$; Rc3 corresponds to a component level fault for the sensor $X_d$; Rc4 corresponds to a component level fault for the sensor $P_{uh1}$; Rc5 corresponds to another component level fault for the position sensor $X_c$; and Rsys1 corresponds to a system level or subsystem level fault such as shown at FIG. 14. In one embodiment, Rc5 can be dependent upon the relationship between the speed of the spool valve and a current of a PWM signal used to control a solenoid moving the spool valve. As shown in the chart of FIG. 22, Cases 1-8 are isolated. Cases 9 and 10 are un-isolated and can be analyzed on a system level for isolation.

FIG. 23 is a fault isolation matrix for v lift cylinder control node 32. In the fault isolation matrix, Rrs1r corresponds to a sensor level fault for the position sensor $X_{rh}$; Rs2r corresponds to a sensor level fault for the sensor $P_{lr}$; Rc1r corresponds to a component level fault for the position sensor $X_{lr}$; Rc3r corresponds to another component level fault for the sensor $X_{lr}$; Rsubsys corresponds to a subsystem level fault determined between the valves $V_{lh}$ and $V_{lr}$; Rs1h corresponds to a sensor level fault for the position sensor $X_{lh}$; Rs2h corresponds to a system level fault for the sensor $P_{lh}$; Rc1h corresponds to a component level fault for the sensor $X_{lh}$; $R_{c3h}$ corresponds to another component level fault for the sensor $X_{lh}$; Rsubsysh is the same system fault as Rsubsysr; and Rsys-bss is a comparison between sensor $P_{th1}$ and $P_{th2}$. Looking to the matrix of FIG. 23, section 300 represent single flag faults isolation information, section 302 represents two flag fault isolation information where the flags are either a sensor level fault or a component level fault, and section 304 represents situations including a sensor or component level fault combined with a subsystem level fault. The bottom row of the chart represents the fault isolation status.

XII. Fault Detection System for Passive and Overrun Conditions

The lift cylinder control node 32 can operate in a passive condition and an overrunning condition. In the passive condition, the lift cylinder 60 pushes against the load. An example of a passive action is when the lift cylinder 60 raises the boom. When this occurs, fluid from the system pump is directed through the valve $V_{lh}$ into the head side 70 of the lift cylinder 60, and fluid from the rod side 72 of the lift cylinder 60 is discharged through the valve $V_{lr}$ to tank 77. When the lift cylinder control node 32 operates in the overrunning condition, the load pushes against the lift cylinder 60. This would occur when a load is being lowered. During an overrunning condition, hydraulic fluid at the head side 70 of the lift cylinder 60 is discharged through the valve $V_{lh}$ to tank 77, and hydraulic fluid from the tank 77 is drawn through the valve $V_{lr}$ into the load side 72 of the lift cylinder 60. During both conditions, it is possible for hydraulic fluid to be conveyed from the accumulator 66 through the valve $V_d$ to the head side 70 of the lift cylinder 60, or from the head side 70 of the cylinder 60 through the valve $V_d$ to the accumulator 66. The direction will be dependent upon the relative pressures of the head side 70 of the cylinder 60 and the accumulator 66. Such hydraulic fluid flow is provided for boom suspension purposes. During an overrun condition, a net flow is directed through the valve $V_t$ to tank 77. Additionally, under certain circumstances, the valve $V_{lr}$ connects the system pump to the rod side 72 of the lift cylinder 60 prevent cavitation.

In certain embodiments, the valves $V_{lr}$, $V_{lh}$ can be designed with an anti-cavitation feature that allows flow through the valves from tank 77 to the cylinder 60 even when the valves are in the closed center position. This flow rate is un-calculatable from spool position and pressure signals.

During a passive actuation condition, flows Q1 and Q2 correspond to the head side 70 of the lift cylinder 60 and flow Q3 corresponds to the rod side 72 of the cylinder 60. Q1 equals the flow that enters the head side 70 from the system pump. This value can be calculated from a flow map of the head side valve $V_{lh}$. Q2 equals the flow between the accumulator 66 and the head side 70 of the lift cylinder 60. This flow can be calculated based on a flow map for the accumulator or a flow map for the damping valve $V_d$. The flow Q3 proceeds to tank 77 and can be calculated by using a flow map for the broad side valve $V_{lr}$. As discussed above, it is known that the flow into or out of the head side 70 equals the flow entering or exiting the rod side 72 multiplied by $A_h$ divided by $A_r$. Thus, assuming flow into the cylinder has a positive sign and flow out of the cylinder has a negative side, $Q1+Q2+Q3 \times A_h/A_r$ should equal zero. If not, a fault flag can be raised. Thereafter, once the fault is isolated, the above formula can be used to create a reference flow that can be substituted into a map for the defective component to generate a virtual signal reading can be substituted into a closed loop control algorithm for the defective component to allow the component to continue to operate.

In an overrunning condition, the flow map for the valve $V_{lr}$ cannot be relied upon because the valve $V_{lr}$ may be operating under un-commanded anti-cavitation conditions. In these conditions, the flow through the valve cannot be calculated. However, the flows through the valves $V_t$, $V_{th}$, $V_{tr}$, and $V_{lh}$ can all be calculated using flow maps. As described previously, the flow passing through valve $V_t$ equals the branch flows from the tilt cylinder control node 30 and the lift cylinder control node 32. Therefore, by subtracting the flows contributed by valves $V_{th}$, $V_{tr}$ and $V_{lr}$ from the total flow passing through the valve $V_t$, it is possible to calculate the flow through the valve $V_{lr}$. This value can then be substituted into the equation described above with respect to passive conditions, and used as another means for identifying and reconfiguring faults. The following sections provide a more detailed description of the above methodology:

| | |
|---|---|
| +: flow into a chamber (work port) | Q_h,lift,pump: pump flow for head side of lift |
| If P_s > P_h,lift, and x_h,lift opens to pressure side, then fluid flows from P_s to work port head of lift, then it is positive | Q_h,lift,tank: tank flow for head side of lift |
| | Q_r,lift,pump: pump flow for rod side of lift |
| | Q_r,lift,tank: tank flow for rod side of lift |
| If P_t > P_h,lift, and x_h,lift opens to tank side, then fluid flows | Q_h,tilt,pump: pump flow for head side of tilt |
| | Q_h,tilt,tank: tank flow for head side of tilt |

| | |
|---|---|
| from P_t to work port head of lift, then it is positive<br>Special case( Anti-cavitation): If P_t > P_h,lift, and x_h,lift in center closed position, then fluid automatically flows from P_t to work port, but the flow rate is un-calculable from spool position and pressure signals.<br>−: flow out of a chamber (work port)<br>If P_t < P_h,lift, and x_h,lift opens to tank side, then fluid flows from work port head of lift to the tank, then it is a negative flow<br>If P_s < P_h,lift, and x_h,lift opens to pressure side, then fluid flows from work port head of lift to the pressure, then it is a negative flow | Q_r,tilt,pump: pump flow for rod side of tilt<br>Q_r,tilt,tank: tank flow for rod side of tilt<br>Q_damp: damping flow between lift head to accumulator |

Up stream flow: from supply pressure to work port head, Q_h,lift,pump (>0)

Down stream flow: from work port rod to tank pressure, Q_r,lift,tank (<0)

Without loss of generality, Q_h.lift.pump is estimated from Ps, P_h,lift, x_h,lift, or flow map Q_h.lift.pump(Ps, P_h,lift, x_h,lift).

Similarly, Q_r.lift,tank(Pt, P_r,lift, x_r,lift)

According to the upstream and downstream flow correlation (i.e., the in-flow and out flow are ratios of one another) of the lift cylinder 60, we have the following constraint (Load Oriented Constraint (LOC))

Residual_Pass(Ps, P_h.lift, x_h.lift, Pt, P_r.lift, x_r.lift)=Residual(Q_h,lift,pump, Q_r,lift,tank):=Q_h, lift,pump+Q_r,lift,tank*A_h/A_r+Q_damp=0

A sensor fault is detected if Residual(Q_h,lift,pump, Q_r,lift,tank) is not equal to 0. In this regard, the potential faulty sensors include Ps, P_h.lift, x_h.lift, Pt, P_r.lift, x_r.lift. Also, "Not equal to" is defined with a threshold and the time window.

(Load Oriented Constraint (LOC)) for overrunning condition is defined as

Residual_Overrun(Pt, P_h.lift, x_h.lift, Ps, P_r.lift, x_r.lift, Pacc, P_h.lift', x_damp, xt, Pt, x_h,tilt, P_h.tilt, x_r.tilt, P_r.tilt)

Residual_Overrun(Q_h,lift,tank, Q_tcu_lift, Q_r, lift.pump, Q_damp):=Q_h,lift,tank−(−Q_tcu_lift+ Q_r,lift,pump+A_r/A_h*Q_damp)/(1−A_r/A_h)=0;

Fault Detection: a fault is detected if Residual_Overrun is not equal to 0. The possible faulty sensor include Pt, P_h.lift, x_h.lift, Ps, P_r.lift, x_r.lift, Pacc, P_h.lift', x_damp, xt, Pt, x_h,tilt, P_h.tilt, x_r.tilt, P_r.tilt)

Q_h,lift,tank(Pt, P_h,lift, x_h,lift)

Q_r,lift,pump(Ps,P_r.lift, x_r.lift)

Q_damp: calculated by Q_damp=f(Pacc, P_h,lift', x_damp)

Q_tcu_lift: calculated by tcu flow Q_tcu(Pt, xt) minus tilt tank flow Q_tcu_tilt(Pt, x_h,tilt, P_h.tilt, x_r.tilt, P_r.tilt) by assuming that tilt service is not in anti-cavitation mode.

| Proof: | In which |
|---|---|
| Derived from the self-explanatory equations: | Q_head : total flow in head side (default <0) |
| −Q_h,lift,tank = Q_r,lift,tank + Q_tcu_lift; | Q_rod: total flow in rod side (default >0) |
| Q_rod = −Q_r,lift,tank + Q_r,lift,pump; | Q_damp (<0 flow out of lift)<br>A_r: rod area |
| Q_head = Q_h,lift,tank + Q_damp; | A_h: head area<br>Q_tcu_lift: the total flow via tank control |
| Q_rod/Q_head = − A_r/A_h; | unit contributed by lift circuit: −<br>Q_tcu_lift = Q_h,lift,tank + Q_r,lift,tank |
| Note : A_r/A_h is Not equal to 1. | |
| In passive case | In overrunning case |
| All sensors are fine. | All sensors are fine |
| Q_h,lift,pump = 4, | Q_damp =0, |
| Q_r,lift,tank=−3. | Q_h.lift.tank=−4, |
| →Residual_Pass(Q_h,lift,pump, Q_r,lift,tank) = 0. No fault detected! | Q_r.lift.pump=1,<br>Q_tcu_lift=2<br>→ Residual_Overrun = 0,<br>No fault detected. |
| A sensor in head side fails. | A faulty sensor on head side |
| Q_h.lift,pump = 5 (actual is 3), Q_r.lift.tank=−3 | Q_damp=0,<br>Q_h.lift.tank=−6 |
| →Residual_Pass(Q_h,lift,pump, Q_r,lift,tank) = 5 + − 3*4/3 =1 . Not zero. A fault detected! | Q_r.lift.pump=1,<br>Q_tcu_lift=2<br>→ Residual_Overrun = −2, threshold is set to be 1/10. A fault is detected! |

If the sensors $V_{th}$, $V_{tr}$, $V_{lh}$ and $V_{lr}$ have commanded anti-cavitation mechanisms, then the same approach described above with respect to the passive condition can be used to generate a relationship between components used to identify a fault condition and provide means for reconfiguring an identified fault condition. This approach can be used for both the passive and overrunning conditions. Once a system fault has been detected and reconfigured, a summing technique can be used for identifying a second sensor fault that may occur. Specifically, if the combined flows from the tilt control module 30 and the lift cylinder control node 32 directed toward the tank 77 are not equal the flow passing through the valve $V_t$, then a fault has been detected and further reconfiguration can be implemented as needed.

Up stream flow: from supply pressure to work port head, Q_h,lift,pump (>0)
Down stream flow: from work port rod to tank pressure, Q_r,lift,tank (<0)
Without loss of generality, flow can be estimated
Q_h.lift.pump is estimated from Ps, P_h,lift, x_h,lift, or flow map Q_h.lift.pump(Ps, P_h,lift, x_h,lift).
Q_r.lift,tank(Pt, P_r,lift, x_r,lift)
Q_damp is a function of P_h,lift', P_acc, x_damp According to the upstream and downstream flow correlation of a cylinder, we have the following constraint (Load Oriented Constraint (LOC))

Residual_Pass_1(Ps, P_h,lift, x_h.lift, Pt, P_r.lift, x_r.lift, P_acc, P_h,lift', x_damp)=
Residual_Pass_1(Q_h,lift,pump, Q_r,lift,tank, Q_damp) :=Q_h,lift,pump+Q_r,lift,tank*A_h/A_r+Q_damp=0

A sensor fault is detected if Residual_Pass_1 is not equal to 0.

"Not equal to" is defined with a threshold and the time window.

| The system in passive condition. The first sensor failure has been detected. The system is reconfigured to stay operational (home limp mode) A second rule is established to detect the second sensor failures, so that the system can be put to fail safe mode. | The second residual is built from the analytical redundancy: the sum of meter out flows have to go thru TCU (Kirchhoff Law)<br>Flow definition<br>Q_tcu: Tcu flow rate as a function of Pt, Xt<br>Q_tcu_tilt: the flow thru TCU contributed by tilt (in figure it is the meter out flow in title Q_r,tilt,tank)<br>Q_tcu_lift: the flow thru TCU contributed by lift (in this case it is the meter out flow rate in lift Q_r,lift,tank). If there is already a sensor fails in lift, then |
|---|---|

Residual_Pass_2 (Q_tcu, Q_tcu_tilt, Q_tcu_lift)
= Residual_Pass_2(Pt, Xt, P_h,titl/P_r,tilt, x_h,tilt/x_r,tilt Ps, P_h.lift, x_h.lift, P_r.lift, x_r.lift, P_acc, P_h,lift', x_damp)
:= Q_tcu + Q_tcu_tilt + Q_tcu_lift = 0
→A second sensor fault is detected if Residual_Pass_2 is not eq. to zero!
→ The scope of sensors covered by the method include Pt, Xt (TCU), P_h,titl/P_r,tilt, x_h,tilt/x_r,tilt (tilt meter out portion), Ps, P_h.lift, x_h.lift, P_r.lift, x_r.lift (any second lift sensor), P_acc, P_h,lift', x_damp (bss damping portion)
(Load Oriented Constraint (LOC)) for overrunning condition is defined as
Residual_Overrun_1(Q_h,lift,tank, Q_r,lift.tank, Q_damp):=
Q_h,lift,tank + Q_damp + Q_r,lift.tank * A_h/A_r =0;
Fault Detection: a fault is detected if Redisual_Overrun_1 is not equal to 0. The possible faulty sensor include Pt, P_h.lift, x_h.lift, P_r.lift, x_r.lift, Pacc, P_h,lift', x_damp
Note that the spool x_r,lift has to be explicitly commanded to open the orifice between tank and rod side so that the flow can flow from tank to rod work port. Therefore, the associated flow rate Q_r,lift,tank can be estimated/calculated. If such a flow can be acquired via other means, then the commanded anti-cavitation mechanism may not be needed.
Fault reconfiguration is covered by other documents.
Residual_Overrun_2 (Q_tcu, Q_h,lift,tank, Q_r,lift,tank, Q_h,tilt,tank, Q_r,tilt,tank)
:= Q_tcu + Q_h,lift,tank + Q_r,lift,tank + Q_h,tilt,tank + Q_r,tilt,tank = 0
Case 1: Both LIFT and TILT in overrunning condition while both work ports connect to the tank (in figure), then
Q_h,lift,tank<0, Q_r,lift,tank>0, Q_h,tilt,tank<0, Q_r,tilt,tank>0
Case 2: LIFT in overrunning condition while TILT in passive (assume head side connect to tank)
Q_h,lift,tank<0, Q_r,lift,tank>0, Q_h,tilt,tank<0, Q_r,tilt,tank=0
Case 3: Both LIFT and TILT in special overrunning condition while one work port connect to the tank and another work port connect to the supply, then
Q_h,lift,tank<0, Q_r,lift,tank=0, Q_h,tilt,tank<0, Q_r,tilt,tank=0
(or) Q_h,lift,tank<0, Q_r,lift,tank>0, Q_h,tilt,tank=0, Q_r,tilt,tank<0
Other similar cases
A second sensor fault is detected if Residual_Overrun_2 is not eq. to zero!

| In passive case | In overrunning case |
|---|---|
| All sensors are fine. | All sensors are fine |
| Q_h,lift,pump = 4, Q_r,lift,tank=-3. | Q_damp =0, Q_h.lift.tank=-4,, Q_r,lift,tank=3 |
| Q_damp=0 | → Residual_Overrun_1 = -4 + 3*4/3 + 0= 0, No fault detected. |
| → Residual_Pass_1(Q_h,lift,pump, Q_r,lift,tank) = 0. No fault detected! | |
| 1st sensor in head side fails. | 1st faulty sensor on head side |
| Q_h.lift.pump = 6 (actual is 4), Q_r.lift.tank=-3 | Q_damp=0, Q_h.lift.tank=-6 (actual -4) Q_r,lift,tank=3→ |
| Residual_Pass_1 = 6 + -3*4/3 =2 . Threshold is set to be 0.1. A fault detected! | Residual_Overrun_1 = - + 3*4/3 +0 = -2, Not zero. fault is detected! |
| System reconfigured to fault operational. In this case, | System reconfigured to allow operation with the first sensor |
| Residual_pass_2 = -3 + 3 = 0. | failure. In this case, |
| 2nd sensor in rod side fails | Residual_Overrun_2 = -4 (correct flow due to FDIR) + 3 + 1 =0 |
| Q_h.lift.pump=6 (actual is 4) Q_tcu_lift = Q_r,lift,tank=-5 (actual is -3) | |
| Q_tcu_tilt =0 | 2nd faulty sensor on rod side |
| Q_tcu = 3 | Q_h,lift.tank = -6, (correct value is -4) |
| Residual_pass_2 = 3 +0 -5 = -2. Larger than threshold 0.1. So residual is not zero. The 2nd fault detected! | Q_r.lift.tank = 8 (correct value is 3) |
| | Q_h,tilt,tank = 0 |
| | Q_r,tilt,tank = -3 (in passive downstream) |
| | Q_tcu = 4. |
| | Residual_overrun_2 = - 6+8+0+-3+4=2, not zero. 2nd fault is detected! |

XIII. Off-Line Fault Isolation

In some applications and under certain scenarios, a fault condition will be detected that cannot be isolated in real-time using the approaches described in other portions of this disclosure. In such a case, the fault sensor must still be isolated and located in order to determine whether any of the control algorithms should be reconfigured for fault operation. Where real-time isolation is not possible, an off-line approach may be used.

Figure 37:
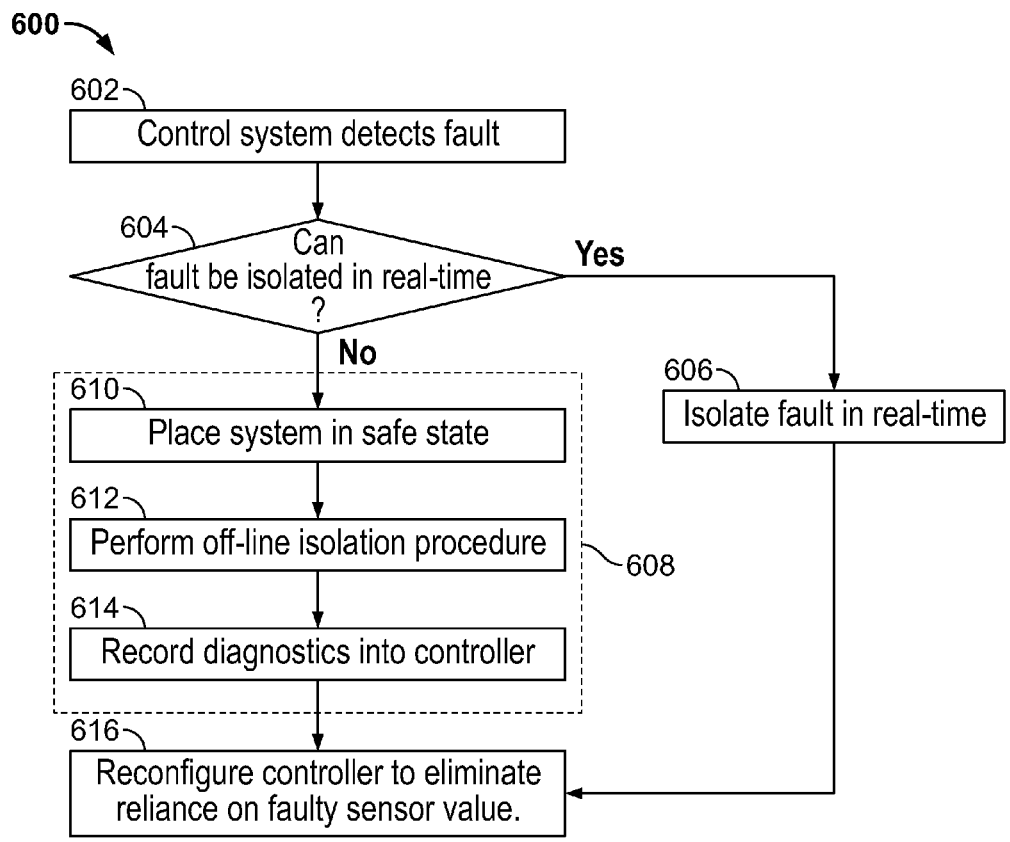
FIG. 37 is a schematic of an on operating method for a vehicle including an off-line isolation procedure having features that are examples of aspects in accordance with the principles of the present disclosure.

Referring to FIG. 37, a method 600 for fault detection, isolation, and controller reconfiguration (FDIR) is shown. In a first step 602 a fault is detected by the control system. Fault detection may be accomplished with any of the approaches described elsewhere in this disclosure. In a second step 604, it is determined whether the fault can be isolated in real-time. If so, the method moves to step 602 where the fault is isolated in real-time and then to step 616 where the controller is reconfigured. Real-time fault isolation and controller reconfiguration can be implemented by using any of the approaches described elsewhere in this disclosure. Additionally, steps 604 and 606 may be implemented simultaneously in that the controller can initially attempt to isolate the fault in real-time upon detection of a fault and, where the fault is not able to be isolated, the controller generates determines that real-time fault isolation is not possible.

When the controller has determined that the fault cannot be isolated, the off-line fault isolation process 608 is initiated. In a step 610, the system is placed into a safe system state. For example, a wheel loader application, the bucket would be lowered to the ground such that the process 608 does not cause the bucket to drop from a raised position unexpectedly. If the lift control node of the system is not faulty, the bucket can be lowered through normal operation, such as by positioning a lever or joystick appropriately. Where the lift control node is faulty, an alternative subsystem, such as a tank control unit, can be used to lower down the bucket. Where the machine is equipped to incrementally lower the bucket by repeatedly moving the joystick or lever between neutral and lowering positions, such an approach can be used as well. Once the bucket is fully lowered to the ground, the system will be in a safe state. One skilled in the art will readily understand that other types of work implements and system components may also need to be placed in a safe state. For example, other types of work implements such as forks on a fork lift or the boom on a telehandler.

Once the system is in a safe state, the controller can perform an off-line isolation procedure in a step 612 and the diagnostics from the procedure can be recorded into the controller in a step 614 to complete the off-line fault isolation process 608. This information can then be used by the controller for reconfiguration in step 616.

Figure 24:
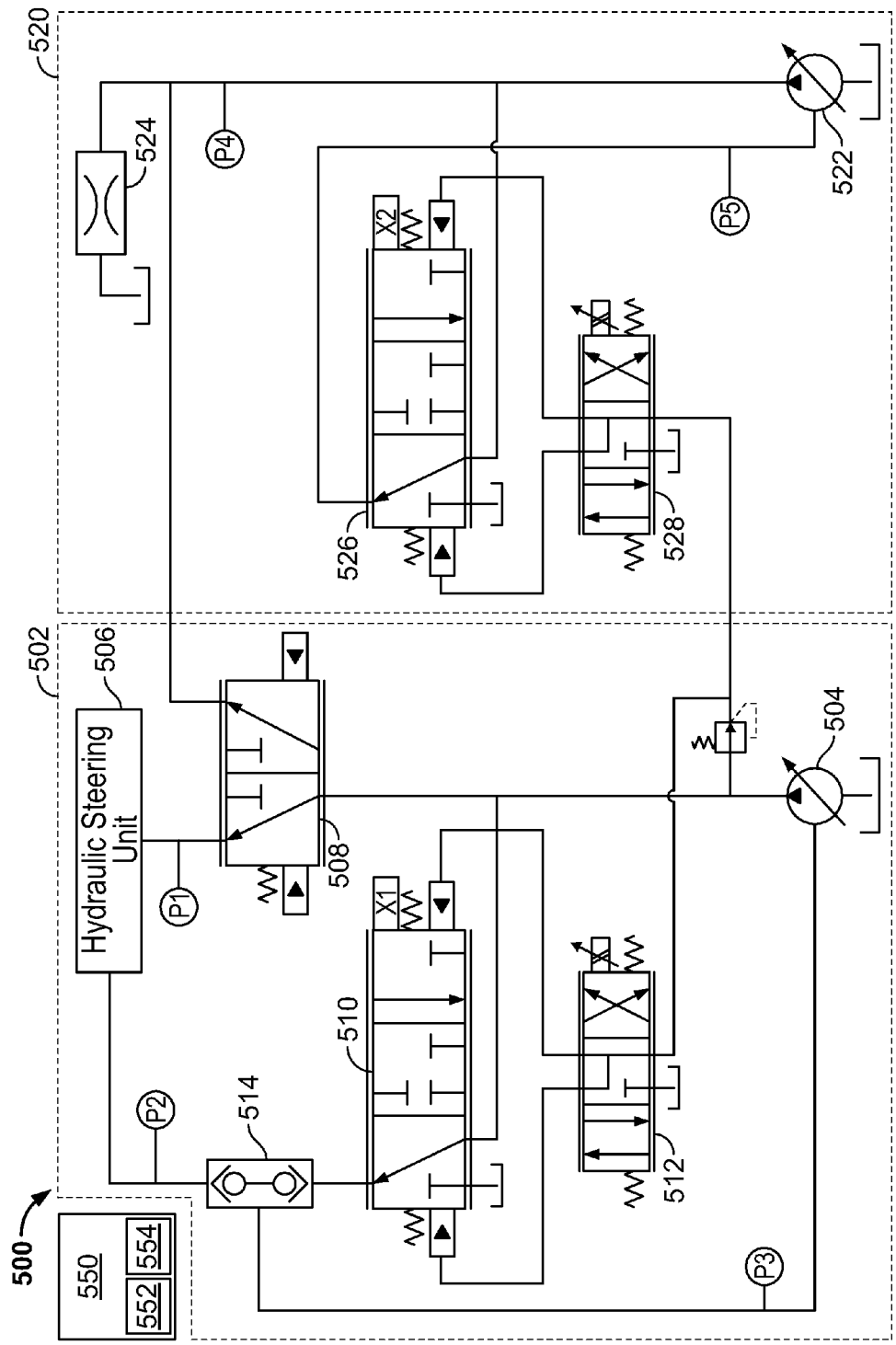
FIG. 24 is a schematic of a hydraulic system having features that are examples of aspects in accordance with the principles of the present disclosure.
Figure 38:
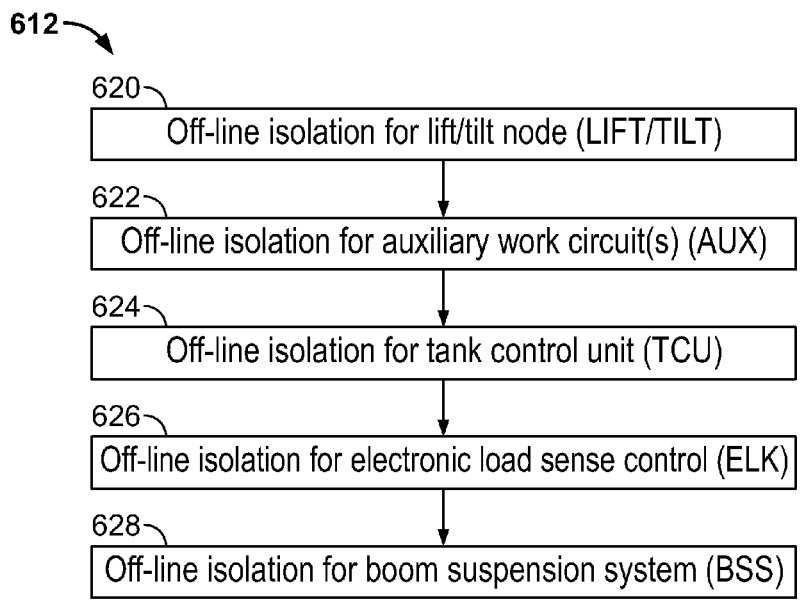
FIG. 38 is a further detailed schematic of the off-line isolation procedure shown in FIG. 37.

Referring to FIG. 38, further details are shown for the off-line isolation procedure 612 for an exemplary application where a fault is isolated for a hydraulic system including multiple nodes, for example the systems shown in FIGS. 1, 4, and 24. However, it is noted that more or fewer nodes may exist on any particular hydraulic system. As shown at FIG. 38, the off-line fault isolation procedure is first performed on the lift/tilt node in a step 620 node, then on the auxiliary work circuit(s) node at step 622, then on the tank control unit node at step 624, then on the electronic load sense control node at step 626, and finally on the boom suspension system node at step 628. Each of these types of nodes is described in further detail elsewhere in the disclosure. For a system having these nodes, the order of fault isolation through the nodes is preferable to maximize information usage and decision robustness.

Figure 39:
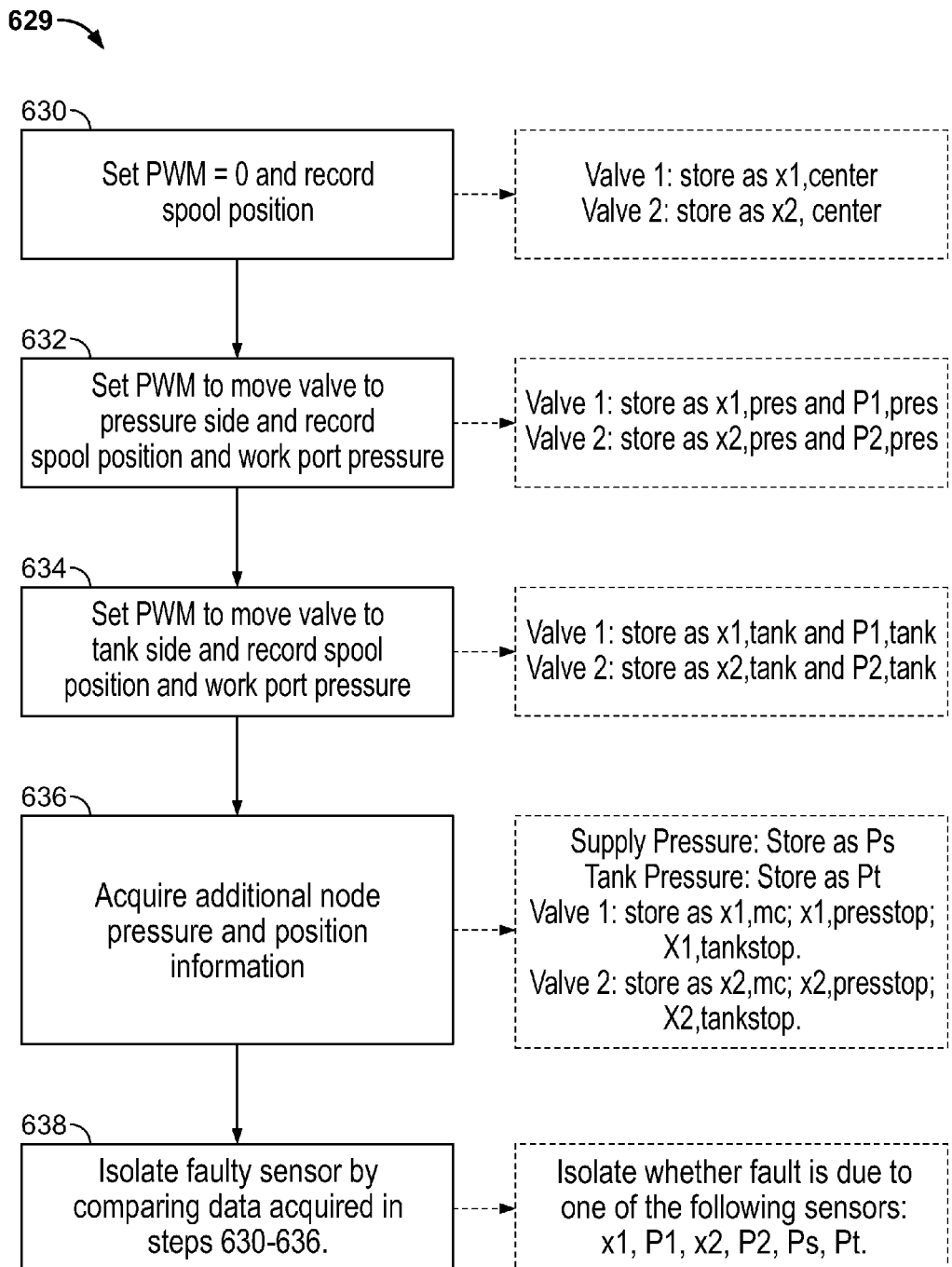
FIG. 39 is a further detailed schematic of the off-line isolation procedure shown in FIG. 37.

Referring to FIG. 39, an off-line procedure 629 having steps 630-638 is shown that is applicable for implementing many of the off-line diagnostics required for steps 620-628. Although a detailed description follows for implementing step 620, it should be understood that the general approach described for procedure 629 has broad applicability to many other systems and nodes.

At step 630 the pulse width modulation (PWM) signal to the control valve(s) associated with the first work port is set to zero and the spool position of the valve(s) is recorded (e.g. $x1$, center and $x2$, center where two valves are used in node). Spool position is determined by a position sensor for each valve, such as an LVDT sensor. At step 632, the PWM signal is set to a sufficient value to fully move the spool to the pressure side of the valve, and the spool position ($x1$, pres; $x2$, pres) and work port pressure ($P1$, pres; $P2$, pres) are recorded. Work port pressure is recorded by a pressure sensor for each valve. At step 634, the PWM signal is set to a sufficient value to fully move the spool to the tank side of the valve, and the spool position ($x1$, tank; $x2$, tank) and work port pressure ($P1$,tank; $P2$,tank) are recorded.

Steps 630 to 634 are performed for each work port/valve in the node. There are commonly two work ports in hydraulic lift circuits. In a step 636, additional information is acquired relating to the node such as supply and tank pressures (Ps; Pt), and for each valve: spool mechanical center ($x1$,mc; $x2$,mc), pressure side stop position ($x1$,presstop; $x2$,presstop), and tank side stop positions ($x1$,tankstop; $x2$,tankstop).

Once the above information has been acquired and stored, the control system can then isolate the faulty sensor in a step 638 by making various diagnostic data comparisons. For example, it can be determined that the spool position sensor for valve 1 is faulty if $x1$,center is not equal to $x1$,mc; or if $x1$,pres is not equal to $x1$,presstop; or if $x1$,tank is not equal to $x1$,tankstop. Likewise, the spool position for valve 2 is fault if $x2$,center is not equal to $x2$,mc; or if $x2$,pres is not equal to $x2$,presstop; or if $x2$,tank is not equal to $x2$,tankstop. The pressure sensor for the first vale can be isolated as being faulty if $P1$,pres is not equal to Ps and $P2$,pres is equal to Ps; or if $P1$,tank is not equal to Pt and $P2$,tank is equal to Pt. Similarly, the pressure sensor for the second valve is faulty if $P2$,pres is not equal to Ps and $P1$,pres is equal to Ps; or if $P2$,tank is not equal to Pt and $P1$,tank is equal to Pt. If the faulty sensor has not been identified at this point, the supply pressure sensor Ps can be identified as faulty if $P1$,pres is equal to $P2$ and $P1$,pres is not equal to Ps. The tank pressure sensor Pt can be isolated as being faulty if $P1$,tank equals $P2$ and $P1$,tank is not equal to Pt. It is noted that the above comparisons can be evaluated as being true or false while taking into account a predefined threshold error value. As stated above, the diagnostic results of the off-line isolation procedure are stored in step 614.

If the faulty sensor has been isolated in step 620, the system can proceed to step 616 for controller reconfiguration or continue through each node in steps 622-628 to determine if further faults exist. If no fault is isolated in step 620, the procedure moves to step 622 for evaluation of the auxiliary work circuits. As the same principle used for the lift node applies to the auxiliary circuits, the isolation procedure can be identical to that as defined in steps 636 to 638.

For the tank control unit evaluation at step 624, it will be already apparent from the evaluation at steps 620 and 622 whether or not the supply pressure sensor and the tank pressure sensor are faulty or not. Accordingly, steps 620 and 622 add to the robustness of the diagnostic evaluation by providing cross-verification of the faulty sensor. As such, it is not necessary to conduct further testing of the supply and tank pressure sensors even though they may be associated with the tank control unit, where one is supplied. Where a tank control unit is supplied with a control valve, the fault isolation procedure for the valve position sensor is the same as that outlined in steps 636-638.

With respect to the evaluation of the electronic load sense control system at step 626, procedures similar to steps 636-638 can also be utilized to isolate spool position sensor faults by setting the PWM output to the valves to various values for each valve in the work and steering circuits. It is noted that the electronic load sense control system (ELK) is shown at FIG. 24. For the work circuit pressure sensor (P4), if the PWM drives the valve spool to a high stand-by position and the work circuit load-sense pressure is not equal to the relief valve pressure, then the work circuit load-sense pressure sensor P4 can be isolated as being faulty. This sensor is also faulty if the PWM drives the valve spool to a lower stand-by position and the work circuit load-sense pressure sensor is not equal to the drain pressure. If the work circuit load-sense pressure sensor has not been found to be faulty after the previous two diagnostics, but the sensed pressure plus the pump margin is not equal to the supply system pressure Ps, then the work circuit load-sense pressure sensor P4 can be isolated as being faulty.

Analysis for the steering circuit of the electronic load sense control system is similar to that of the work circuit. If the PWM drives the spool to a high stand-by position and the steering circuit load-sense pressure is not equal to the relief valve pressure, then the steering circuit load-sense pressure sensor P3 is faulty. Additionally, if the steering circuit load-sense pressure plus the pump margin is not equal to the pressure at the outlet of the priority valve, then it can be determined that either the steering circuit load-sense pressure sensor P3 is faulty or the pressure sensor P1 at the outlet of the priority valve is faulty. If the PWM drives the spool to a lower stand-by position and if steering circuit load-sense pressure P3 is not equal to the sensed pressure after the hydraulic steering unit at sensor P2, then it can at least be determined that either P2 or P3 is faulty.

With respect to the off-line isolation procedure for the boom suspension system (BSS) at step 628, the charge valve and damping valve pressure and position sensors in this system can also be evaluated using a procedure generally similar to that described for steps 630-638, with some modifications to account for an installed accumulator system. For each of the commanded PWM positions, the BSS accumulator pressures are recorded. When the PWM commands the charging valve to move to the pressure side position, the accumulator pressure should be equal to the supply pressure. When the PWM commands the charging valve to the tank side position, the accumulator pressure should be equal to the drain pressure, although this is generally a small value. If equality fails at either of the two valve positions, and the supply pressure sensor is good from the previous evaluation (s), then the accumulator pressure sensor in the BSS can be isolated as being faulty.

With respect to the damping valve in the BSS, the general approach described is applicable. In the case where the spool is spring biased, then only two PWM values are needed, 0 and 100%. The spool will be discretely moved to two extreme positions. The recorded sensor values can be compared to the pre-calibrated number stored in the controller. If the numbers do not match, then the damping valve position sensor can be identified as being faulty. When the damping valve is in the fully open position and the accumulator pressure sensor has not already been found to be faulty, the pressure sensor associated with the damping valve can be isolated as being faulty its output value does not match the accumulator pressure sensor.

Once steps 620, 622, 624, 626, and 628 are completed, where applicable, the off-line isolation procedure is completed and the results of the diagnostics can be recorded into the controller. At this time off-line isolation step procedure 608 is complete and the system can be returned to normal operation dependent upon recalibration steps performed at step 616.

XIV. Reconfiguration at Low Flow Conditions

In some applications and under certain scenarios, calculations for providing analytical redundancy through the estimating of flow rates (i.e. building a virtual flow meter) will provide insufficient values for valve position and hydraulic pressure at very low flow rates. This is primarily due to the loss of a good correlation between flow rate, fluid pressure, and valve position below a certain flow rate into or out of the valve. As such, the flow rate estimating methods described are not applicable within a certain deadband of flows through the valve.

One solution for providing better estimation of the valve position and fluid pressure at times when the flow rate is within the low flow deadband is to define a low flow mode of operation wherein an alternative method is utilized to estimate position and flow at these conditions.

Figure 40:
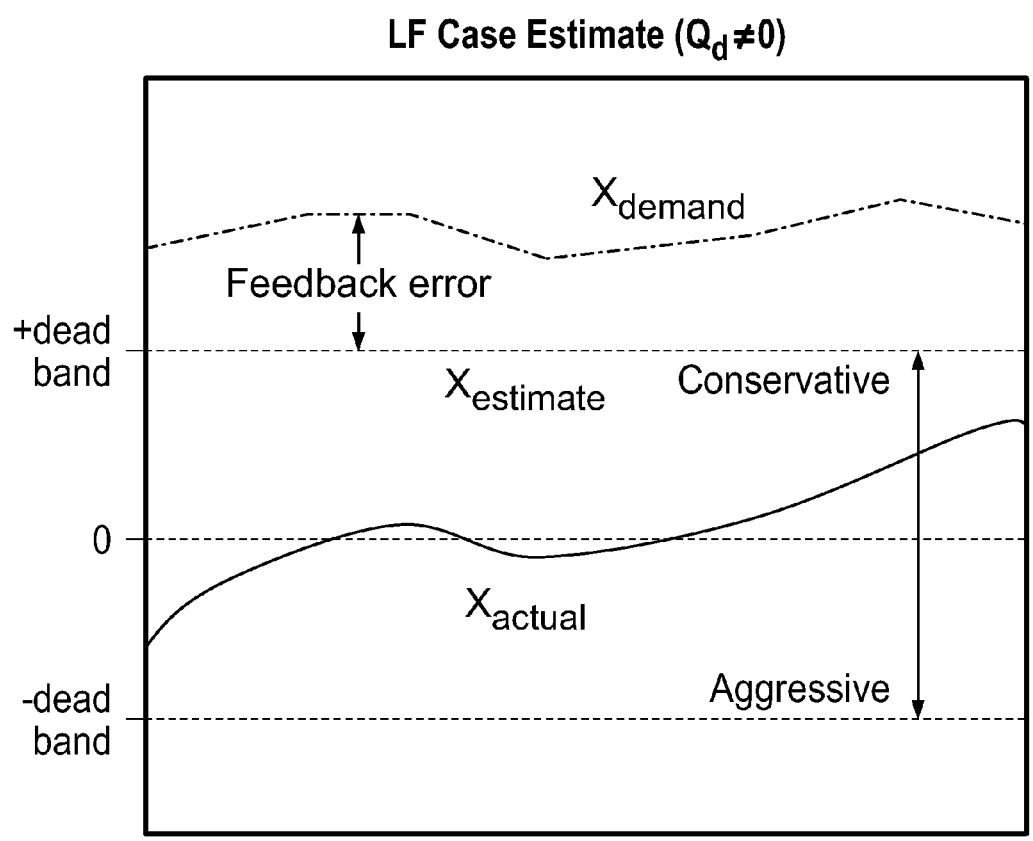
FIG. 40 is a schematic of a low flow mode of operation for the hydraulic system of FIG. 4.

In the low flow mode of operation, one way to provide an estimated valve position is to define a flow threshold band having a positive threshold value and a negative threshold value, as shown in FIG. 40. This approach can provide for three different estimated valve positions depending upon the relationship between the demand flow rate and the bounds of the threshold band. For example, if the demand flow rate is greater than the positive threshold value, then the position of the valve can be estimated as a fixed value corresponding to the positive flow edge of the deadband. Correspondingly, if the demand flow rate is less than the negative threshold value, then the position of the valve can be estimated as a fixed value being on the opposite edge of the deadband. If the demand flow rate is between the positive and negative threshold values (i.e. within the threshold band), the PWM signal to the valve can be disabled to avoid uncontrolled movements of the valve and the position of the valve can be estimated as being zero.

Estimating position in the low flow mode of operation can be further enhanced by adding a hysteresis between the modes of operation to avoid valve chattering. Additionally, a configurable offset can be provided from the map edge to increase the perceived position error and improve system speed in exiting the low flow mode. This offset can be fixed or set as a function of flow demand. For example a decreasing offset can be implemented as flow increases or decreases depending upon the application. A hysteresis can also be provided on the offset to avoid chattering.

In the low flow mode, it can be assumed that the valve poppets are closed and that the pressure can be anything. One estimate for the pressure could simply be the tank pressure. Another estimate for the pressure could be the supply pressure minus the pressure margin. Depending upon which sensor is faulty in the system, it may be preferable to use one or the other. For example, for a faulty rod side sensor it is preferable to use the tank pressure as the estimated pressure value because this side of the actuator will never be on the output side for an overrunning load. As such, there is no danger of load drop. However, if this value is not made passive in the control system, the system could get stuck in the low flow operating mode. If the faulty sensor is the head side pressure sensor, then the estimated value should be set to equal the system pressure minus the pressure margin. This is estimation is equivalent to assuming an overrunning load in the downward direction which will ensure that there is no load drop. It is assumed that the work implement will never have an overrunning load in the upward direction. However, in other applications where a load could be exerted from the rod side, the selection of which estimate to use for the pressure value would be the reverse of what is described above. It is also noted that the decision criteria for which estimate to use for the pressure sensor is independent of the direction of the demand flow.

XV. Fault Detection, Isolation, and Reconfiguration for a Load-Sense Pump Application Referring to FIG. 24, a schematic diagram is shown for a hydraulic system 500. As shown, hydraulic system 500 includes a steering circuit 502 and a work circuit 520. Steering circuit 502 is for enabling a vehicle to be steered through the operation of the hydraulic system, such as through a steering wheel, a joystick, or an automated GPS based system. Work circuit 504 is for enabling any variety of work type functions that could be performed by hydraulic actuators, such as cylinders or hydraulic motors. For example, work circuit 504 could be used to operate hydraulic actuators in a telehandler vehicle having lift, tilt, extend, and/or side shift functions.

As shown, steering circuit 502 includes a steering circuit pump 504 that supplies pressurized fluid to a hydraulic steering unit 506. Hydraulic fluid pressure and flow to the hydraulic steering unit 506 from the pump 504 are controlled through a number of hydraulic components well known in the art. In the particular embodiment shown, these components are: a pilot-operated main stage valve 510, a solenoid-operated pilot stage valve 512, and a shuttle valve 514 for providing load sense pressure to the pump 504. Steering circuit 502 additionally includes a priority valve 508 for sharing fluid power with the work circuit 520 when excess fluid power from pump 504 is available and needed.

As shown, work circuit 520 includes a work circuit pump 522 that provides fluid power to a load work circuit 524. Load work circuit 524 is schematically shown as being a fixed orifice for the purpose of simplicity. However, it should be understood that load work circuit 524 can include single or multiple dynamic load work circuits. For example, the load work circuit 524 could include any or all of the circuits shown in FIG. 4. Hydraulic fluid pressure and flow to the load work circuit 524 from the pump 522 are controlled through a number of hydraulic components well known in the art. In the particular embodiment shown, a pilot-operated main stage valve 526 and a solenoid-operated pilot stage valve 512 are provided.

The steering circuit 502 and work circuit 520 can also include a number of sensors that are useful for optimizing the control of the hydraulic system 500. With respect to the steering circuit 502, a first pressure sensor P1 is provided after the priority valve 508, a second pressure sensor P2 is provided after the hydraulic steering unit 506, and a third pressure sensor P3 is provided after the shuttle valve 514. A position sensor X1, such as an LVDT sensor, is also provided on the main stage valve 510. With respect to the work circuit 520, a fourth pressure sensor P4 is provided upstream of the load work circuit 524 and a fifth pressure sensor P5 is provided after the main stage valve 526. A position sensor X2, such as an LVDT sensor, also provided on the main stage valve 526.

Hydraulic system 500 also includes an electronic controller 550. The electronic controller comprises a non-transient storage medium 552, a processor 554, and one or more control algorithms 556 stored on the non-transient storage medium and executable by the processor. The electronic controller is also configured to communicate with a supervisory controller and/or with controllers in other nodes of the vehicle operation system, and is referred to as an "ELK" controller or node in other parts of the disclosure. In order to provide optimal control of the pumps 504, 522, the aforementioned sensors P1 to P4 and X1 to X2 may be placed in communication with a controller 550, as can be the solenoid output control signals to valves 512 and 528 and the output signals to pumps 504, 522. In one embodiment, the control algorithm for the controller is configured to allow the electronic controller to operate the hydraulic system between a non-share mode in which pumps 504, 522 independently serve circuits 502, 520, respectively, and a share mode in which pump 504 supplies additional fluid power to the work circuit 520.

Fault Detection

In order to ensure that the hydraulic system 500 is operating sufficiently, the electronic controller 550 can be configured to continuously or periodically monitor for faults conditions within the system. A fault can occur is when a sensor(s) provides a signal to controller 550 that is inaccurate, not reflective of actual operating conditions, and/or that indicates the system is not achieving desired performance levels. Common types of sensor faults are: noise, out of range on the high end, out of range on the low end, stuck position, offset tracking high, and offset tracking low (see FIGS. 8-11). These types of faults are applicable to both pressure and position sensors. One way in which these types of faults can be detected is to define conditions within the controller which will trigger a general fault signal. Many conditions of this type can be defined that are useful for fault detection.

The following paragraphs define fifteen exemplary conditions that constitute a non-exclusive, exemplary list of potential conditions that could be used by controller 550 for fault detection.

A first fault condition C1 can be detected when the absolute difference between the desired position (X_des) for valve 526 and the received signal from sensor X2 exceeds a maximum error value for a period of time. For example, where the maximum error value is 50 micrometers and the period of time is 0.5 seconds, a fault will be detected if (abs(X_des−X2)>50) for more than 0.5 seconds.

A second fault condition C2 can be detected when the absolute difference between a calculated velocity of valve 526 based on sensor X2 signal (VEL_1) and a calculated velocity of valve 526 based on the PWM output signal to valve 528 (VEL_2) exceeds a maximum value for a period of time. For example, where the maximum error value is _ and the period of time is 0.5 seconds, a fault will be detected where abs(VEL_1−VEL_2)>_ for more than 0.5 seconds.

A third fault condition C2 can be detected when the absolute value of pressure at P4 minus pressure at P5 minus a pressure margin exceeds a maximum error value for a period of time. For example, where the pressure margin is 15 bars and the maximum error value is 3 bars, a fault will be detected where (abs(P4−P5−15)>3) for more than 0.5 seconds.

A fourth fault condition C4 can be detected when the pressure at P4 is less than pressure at P5. For example, a fault will be detected if P4>P5 for any amount of time.

A fifth fault condition C5 can be detected when the difference between desired pressure (P_des) and pressure at P4 exceeds a maximum error value for a period of time. For example, where the maximum error value is 3 bars and the period of time is 0.5 seconds, a fault will be detected where abs(P_des−P4)>3 for more than 0.5 seconds.

A sixth fault condition C6 can be detected when the absolute difference between design position (X_des) for valve 510 and the received signal from sensor X1 exceeds a maximum error value for a period of time. For example, where the maximum error value is 50 micrometers and the period of time is 0.6 seconds, a fault will be detected if (abs(X_des−X1)>50) for more than 0.6 seconds.

A seventh fault condition C7 can be detected when the absolute difference between a calculated velocity of valve 510 based on sensor X1 signal (VEL_1) and a calculated velocity of valve 510 based on the PWM output signal to valve 512 (VEL_2) exceeds a maximum error value for a period of time. For example, where the maximum error value is _ and the period of time is 0.5 seconds, a fault will be detected where abs(VEL_1−VEL_2)>_ for more than 0.5 seconds.

An eighth fault condition C8 can be detected when the pressure at P3 is less than pressure at P2 (P3>P2). For example, a fault will be detected if P3>P2 for any amount of time.

A ninth fault condition C9 can be detected when the difference between pressure at P3 and the sum of the pressure at P2 and a pressure margin exceeds a maximum error value for a period of time. For example, where the pressure margin is 8 bars, the maximum error value is 2 bars, and the period of time is 0.5 seconds, a fault will be detected if ((P3−P2+8)>=2) for more than 0.5 seconds.

A tenth fault condition C10 can be detected when the pressure at P3 plus a pressure margin is less than or equal to the pressure at P1 for a period of time. For example, where the pressure margin is 15 bars and the period of time is 0.2 seconds, a fault will be detected when ((P3+15)<=P1) for more than 0.2 seconds.

An eleventh fault condition C11 can be detected when the absolute value of pressure at P3 plus a pressure margin minus the pressure at P1 is greater than a maximum error value for a period of time. For example, where the pressure margin is 15 bars, the maximum error value is 5 bars, and the period of time is 0.2 seconds, a fault will be detected when (abs(P3+15−P1)<=5) for more than 0.2 seconds.

A twelfth fault condition C12 can be detected when the pressure at P1 minus the pressure at P2 minus a pressure margin is less than zero for a period of time. For example, where the pressure margin is 15 bars and the period of time is 0.2 seconds, a fault will be detected when (P1−P2−15)<0 for more than 0.2 seconds.

A thirteenth fault condition C13 can be detected when the pressure at P1 is more than a maximum pressure value or less than a minimum pressure value indicating that the pressure signal is out of range. For example, where the maximum pressure value is 300 bars and the minimum pressure value is 0 bar, a fault will be detected when P1>300 or when P1<0.

A fourteenth fault condition C14 can be detected when the pressure at P2 is more than a maximum pressure value or less than a minimum pressure value indicating that the pressure signal is out of range. For example, where the maximum pressure value is 300 bars and the minimum pressure value is 0 bar, a fault will be detected when P2>300 or when P2<0.

A fifteenth fault condition C15 can be detected when the pressure at P3 is more than a maximum pressure value or less than a minimum pressure value indicating that the pressure signal is out of range. For example, where the maximum pressure value is 300 bars and the minimum pressure value is 0 bar, a fault will be detected when P3>300 or when P3<0.

Figure 25:
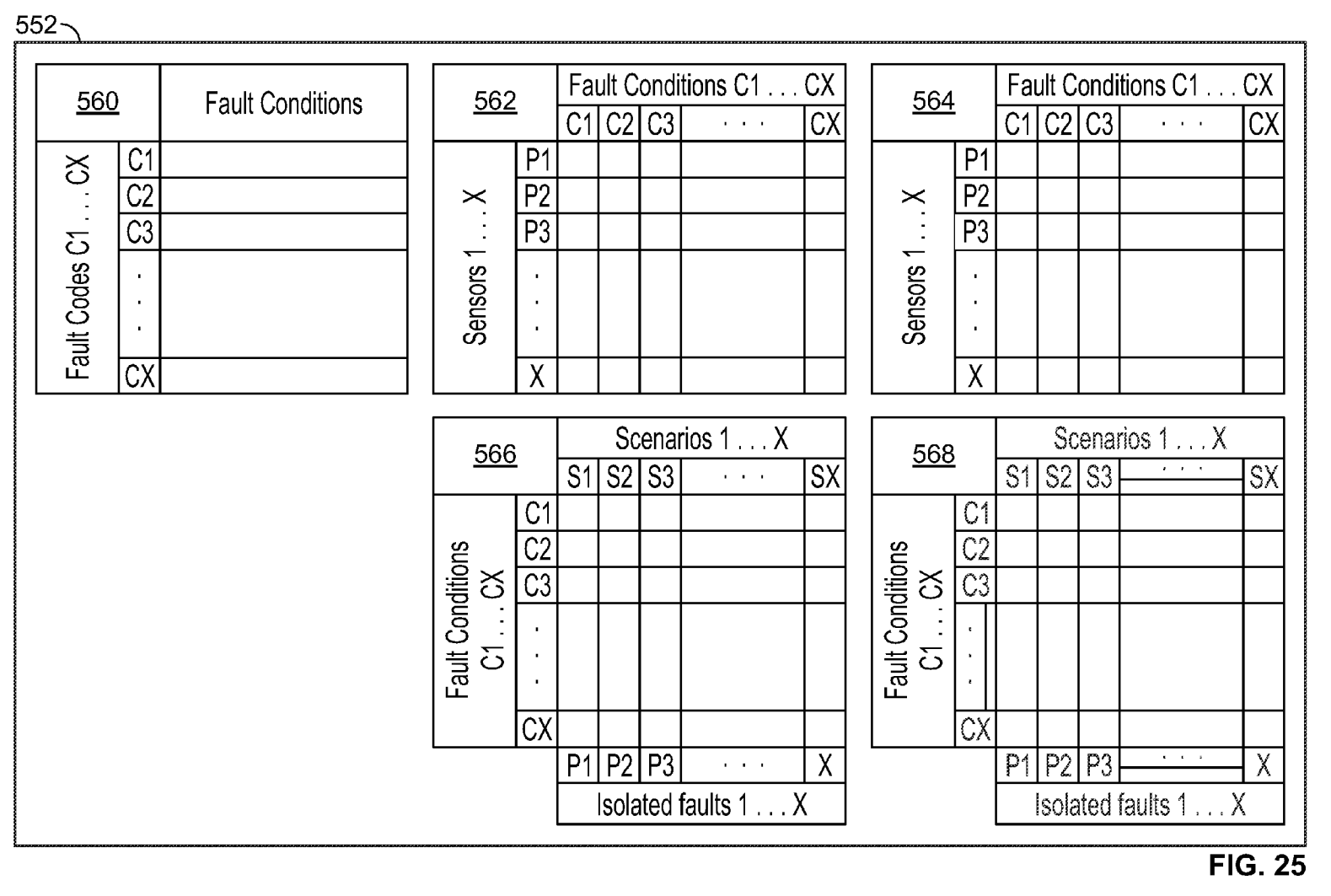

As stated above, any number of fault conditions may defined for the hydraulic system 500. Additionally, the fault conditions may be stored in a table or matrix 560 within controller 550, as shown in FIG. 25. A detailed example of table 560 is provided at FIG. 26. This map can be referred to by controller 550 such that the appropriate fault condition code may be generated when a fault condition is detected.

Fault Isolation

Once a fault condition has been detected and a fault code has been generated, the sensor responsible for causing the fault can be isolated during the normal operation of the vehicle associated with hydraulic system 500 without interruption. Where only one sensor is associated with a particular fault condition code and where that particular fault condition is the only condition for which a fault is indicated, the responsible sensor will be readily apparent. For example, where only fault conditions C13, C14, or C15 are detected, it can be ascertained that the fault can be isolated to sensors P1, P2, or P3, respectively. However, where fault conditions involve multiple sensors and/or where multiple fault conditions are detected, fault isolation becomes more complicated. Additionally, certain sensor failure types from a single sensor can trigger multiple fault conditions.

Figure 27:
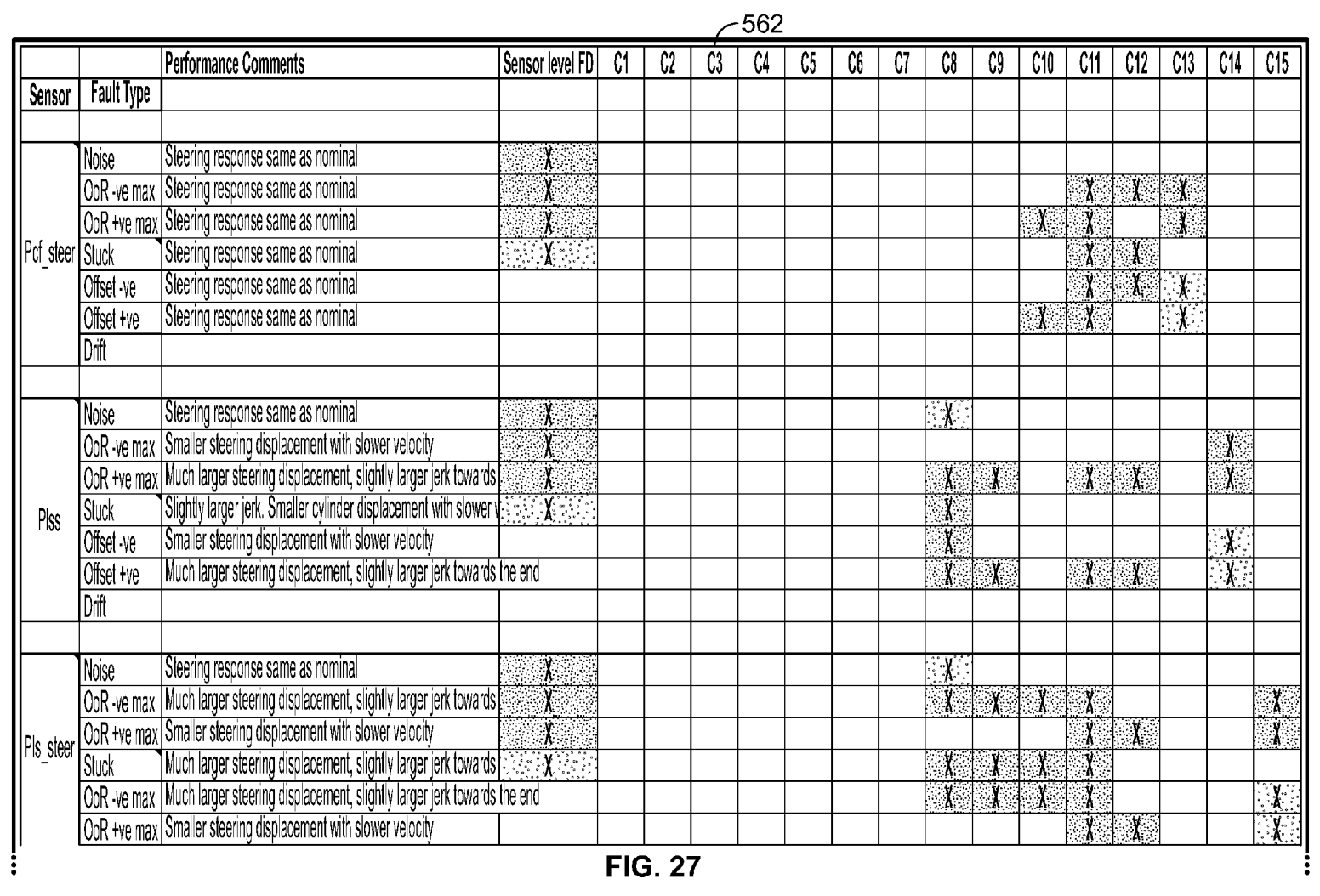

Referring to FIG. 25, primary fault isolation matrices 562, 564 are shown. These matrices correlate sensor faults, for example faults relating to P1-P5 and X1-X2, to the defined fault conditions codes, for example C1 to C15. Detailed examples of matrix 562 and matrix 564 are presented at FIGS. 26 and 27, respectively. For each sensor, faults for noise, out of range on the high end, out of range on the low end, stuck position, offset tracking high, and offset tracking low are shown. Two different primary matrices are utilized because the system, as configured, is capable of running in the non-flow share mode (matrix 562) and in the flow share mode (matrix 564) which changes the relationship among the sensors. As such, the controller 550 will refer to the appropriate matrix based on the current operating mode of the hydraulic system 500. It should be noted that fewer or more primary fault isolation matrices may be provided based on the number of systems and subsystems that are interacting with each other, and that the disclosure is not limited to using two matrices.

Using the primary matrix it is possible to identify certain faults when a fault condition is detected. For example, and as stated above, where only condition C13 is detected, the matrix shows that sensor P1 is responsible for the fault. Further resolution as to the nature of the fault can be provided by using sensor level fault detection (discussed in other portions of this disclosure) in combination with the fault conditions identified in the matrices.

However, other cases require a more refined analysis. For example, in the case where fault conditions C11 or C12 are detected when the system is in the non-flow share operating mode, it can be seen that the fault could be due to up to any of the four sensors associated with the steering circuit, P1, P2, P3, or X1. The analysis is further complicated where multiple fault conditions are simultaneously detected. As such, the primary fault isolation matrix may be unable to isolate certain faults depending upon how the fault conditions are defined. Where such a condition exists, a further analysis is required.

Referring to FIG. 25, secondary fault isolation matrices 566, 568 are provided for the non-flow and flow share modes, respectively. A detailed example of matrix 566 can be found at FIG. 29 while a detailed example of matrix 568 can be found at FIG. 30. The secondary fault isolation matrix is for isolating those faults that cannot be isolated by the primary fault isolation matrix by correlating the fault isolation codes, for example C1-C15 to a plurality of scenarios consisting of different patterns of detected fault conditions. In the embodiments shown, thirteen scenarios of different fault patterns are included. However, it should be appreciated that more or fewer scenarios could be included to provide coverage over fewer or more potential fault patterns.

By operating the system under various conditions with known faults in the system, or through modeling, certain patterns of fault conditions can be associated with a specific sensor fault. For example, and with reference to FIG. 29 specifically, it can be seen that scenario 2 reflects the state where fault conditions C8, C9, C11, C12, and C14 have been detected and are correlated to a fault condition with sensor P2. Accordingly, some faults for which isolation by the primary isolation matrix is indeterminate can be isolated with matrices 566, 568 if the matrices include the same pattern of detected fault conditions. It is noted that matrices 566 and 568 do not include scenarios for which faults can be isolated through the use of the primary fault isolation matrices 564, 565.

Where a fault cannot be isolated using the above described approach, an off-line fault isolation procedure may be implemented. A detailed description for off-line fault isolation for hydraulic systems, including for the hydraulic system 100 shown in FIG. 24 is provided in another portion of the disclosure. Accordingly, fault detection and reconfiguration for hydraulic system 100 be implemented in conjunction with either the real-time isolation approach described in this section or the off-line approach described elsewhere. Furthermore, the real-time isolation approach may be utilized first, and if found to be indeterminate, the off-line approach may be then used. Also, a residual based isolation approach (e.g. see FIGS. 22 and 23) may also be used in conjunction with or instead of the fault isolation matrices discussed above.

Reconfiguration

Once a fault has been detected and isolated, it is possible to reconfigure the nominal control algorithms stored in controller 550 of the hydraulic system 500 such that adverse effects of the faulted sensor can be mitigated. In one embodiment, analytical redundancy (discussed in further detail in other sections of this disclosure) is utilized to develop a virtual signal for a faulted sensor. This virtual signal can then be used as a replacement value in the nominal control algorithms present in controller 550. In one embodiment, the nominal control algorithm is replaced with a reconfigured control algorithm that does not rely upon a value relating to the faulted sensor.

Figure 31:
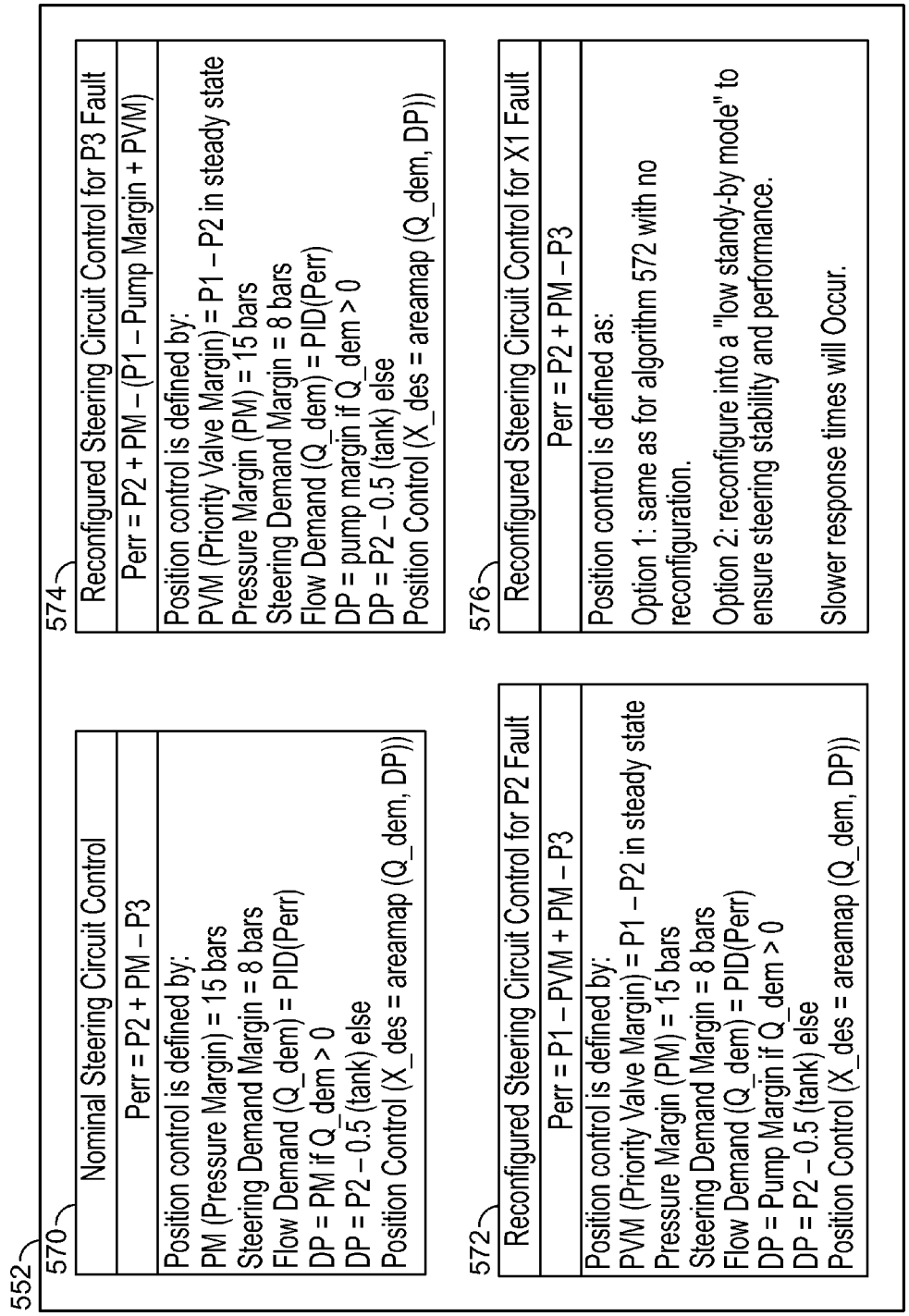
FIG. 31 is a schematic view of control algorithms stored on the controller for operating the steering circuit of FIG. 24.

In one embodiment, and as shown at FIG. 31, a first nominal control algorithm 570 is stored on controller 550 for controlling the steering circuit. Algorithm 570 is utilized when there are no faults detected in relation to the sensors relating to the steering circuit 502. The following paragraphs describe potential reconfigurations to the nominal control algorithm based on various fault conditions.

Still referring to FIG. 31, a first reconfigured control algorithm 572 is shown. When a fault condition is detected and isolated to sensor P2, the nominal steering circuit control algorithm 570 will provide inadequate control as the Pen equation explicitly relies upon the input value for sensor P2. Accordingly, the first reconfigured control algorithm 572, which does not rely upon a value for sensor P2, can be utilized for the steering circuit control instead of the nominal control. When this occurs, the steering circuit 502 is operating in a reconfigured state.

In the event that a fault is detected and isolated to sensor P3, the nominal control algorithm 570 may be replaced by a second reconfigured control algorithm 574, as shown at FIG. 107. Second reconfigured control algorithm 574 does not explicitly rely upon a value for sensor P3, and therefore will provide better performance for the steering circuit 502 in the event of a fault with sensor P3.

Where a fault condition occurs with sensor X1, a third reconfigured control algorithm 576 can be utilized. Algorithm 576 can use the same control as for algorithm 570, but slower response times will occur. Alternatively, the reconfigured algorithm 576 can place the steering circuit 502 into a low stand-by mode in which lower a lower level of functionality is provided, but with better assurance of steering stability and performance. Where a fault condition occurs with sensor P1, no reconfiguration is necessary and the nominal control algorithm 570 can continue to be used. Reconfiguration for this sensor, in the embodiment shown, is not necessary since the output from the signal is not a variable in the nominal algorithm 570. It is noted that any number of reconfigured control algorithms may be placed in controller 550, and that the use of a particular reconfigured control algorithm may be based on a number of variables and conditions that can be defined within the controller 550.

Figure 32:
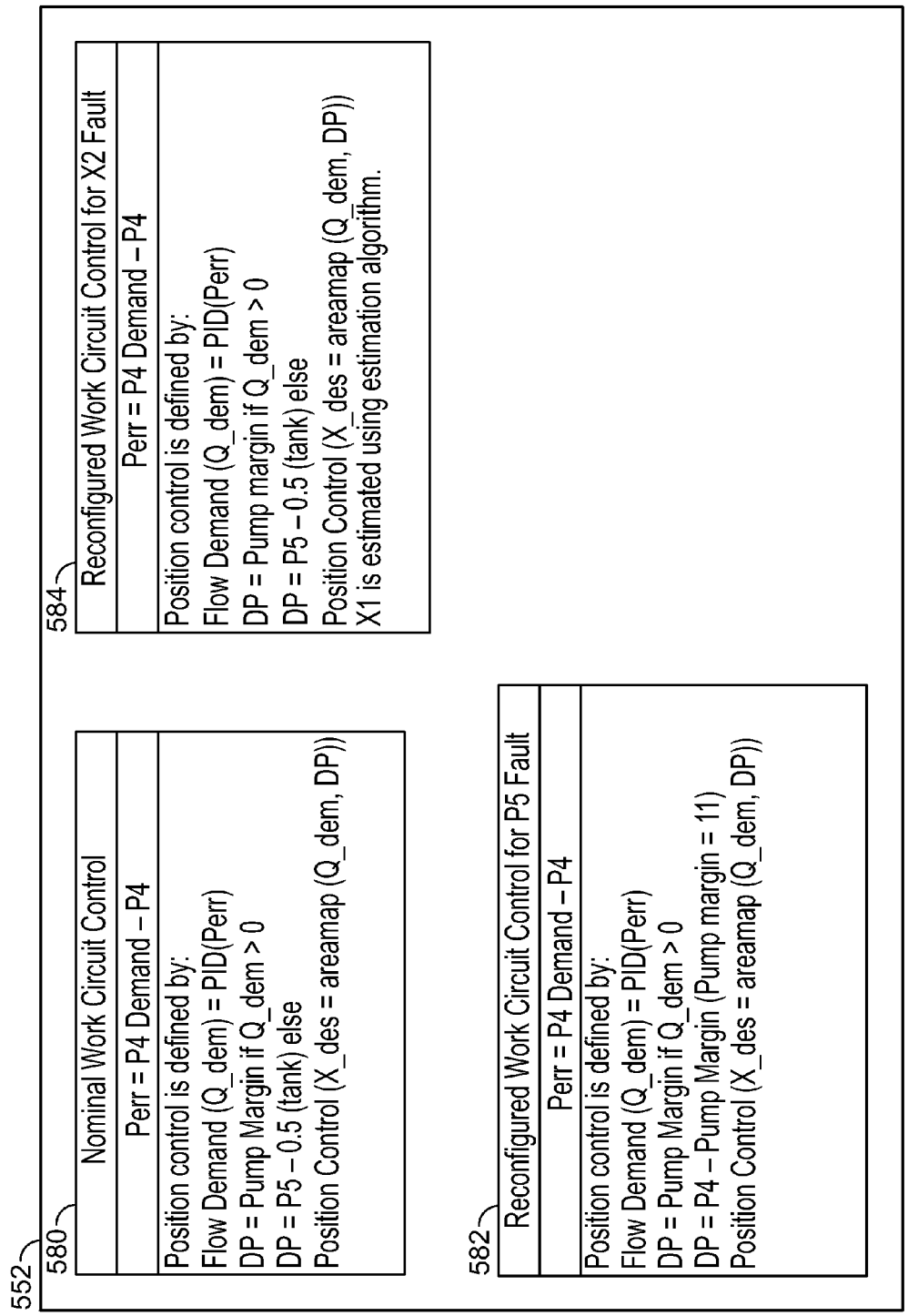
FIG. 32 is a schematic view of control algorithms stored on a controller for operating the work circuit of FIG. 24.

The work circuit 504 may also utilize reconfigured control algorithms instead of the nominal control where a fault is detected and isolated to sensor P4 or X2. With reference to FIG. 32, a nominal work circuit control algorithm 580 is shown. If a fault is detected and isolated to sensor P5 a fourth reconfigured control algorithm 582 may be utilized. Although reconfiguration is not required for a fault with sensor P5, the value from sensor P4, in combination with the pump margin value, may be used in the DP equation to provide an alternative means of providing an estimated value for the P5. This reconfiguration strategy will provide a response time that is close to that achieved during normal operation.

If a fault is detected and isolated to sensor X2, a fifth reconfigured control algorithm 584 may be utilized. Algorithm 584 includes the same Perr calculation, however the value for X2 is estimated through the use of an estimation algorithm. In one embodiment, the estimation algorithm includes a calculating a discrete derivative, a flow estimate, an area estimate, and utilizing an map to correlate area and position. As an estimating calculation introduces a time delay into the control system, a Smith Predictor may be utilized for enhanced control. Various other estimating algorithms known in the art may be used for estimating a value for sensor X2 in algorithm 584.

Figure 33:
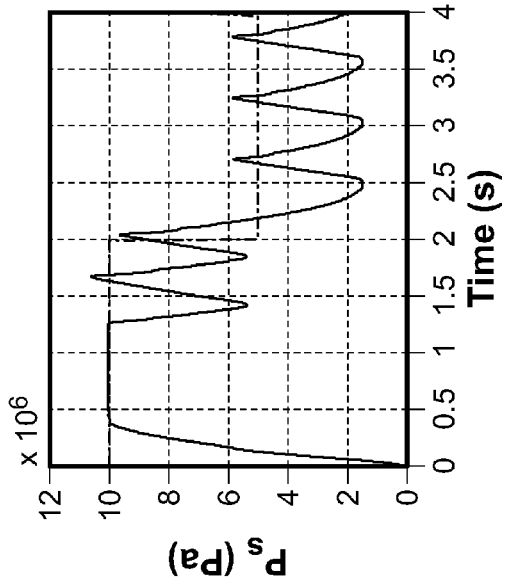
FIG. 33 shows a performance graph for normal operation of the work circuit shown in FIG. 24.
Figure 34:
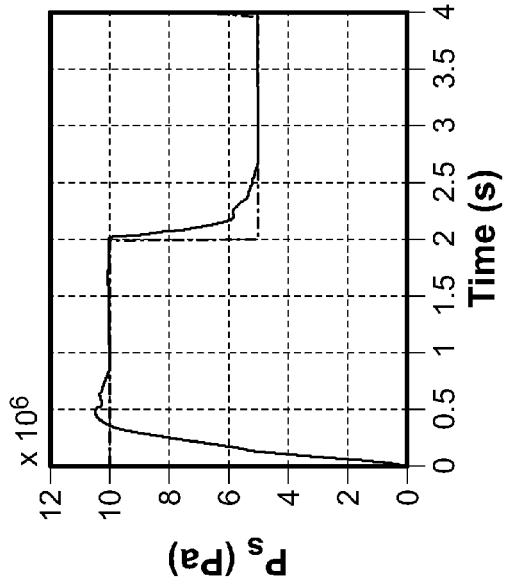
FIG. 34 shows a performance graph for operation of the work circuit of FIG. 24 when a fault initially occurs with a position sensor.
Figure 35:
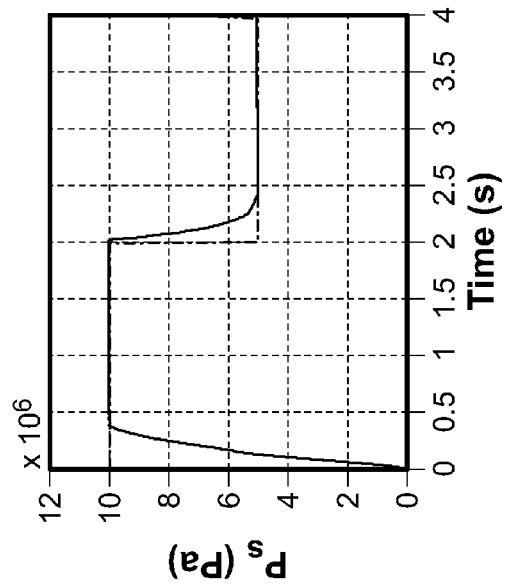
FIG. 35 shows a performance graph for operation of the work circuit of FIG. 24 after a fault has been detected and isolated, and after the control algorithm for the work circuit has been reconfigured.
Figure 36:
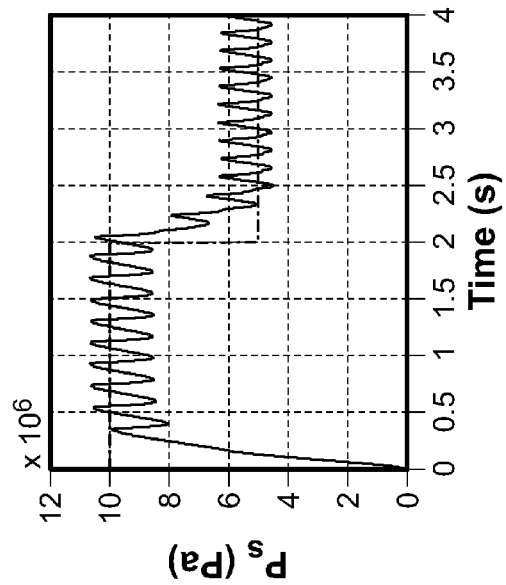
FIG. 36 shows a performance graph for operation of the work circuit of FIG. 24 after a fault has been detected and isolated, and after the control algorithm for the work circuit has been reconfigured with a Smith Predictor.

Referring to FIGS. 33 to 36, example graphs are provided to show the result of the above described fault detection, isolation, and reconfiguration approach. The graphs shown in FIGS. 33-36 relate to a fault occurring with sensor X2. FIG. 33 shows normal operation in which no faults are detected and control algorithm 580 is being relied upon. FIG. 34 shows a fault occurring at 1.25 seconds where it can be seen that control performance is significantly degraded when algorithm 580 is still in place. FIG. 35 shows enhanced performance once the controller 550 has detected and isolated the fault with sensor X2 and has accordingly switched to operation with control algorithm 584 wherein X1 is estimated using an estimation algorithm. FIG. 36 shows further enhanced performance where the estimation algorithm further includes the use of a Smith Predictor.

As can be readily appreciated, the above described fault detection, isolation, and reconfiguration approach can result in significantly improved performance in a fault condition, as compared to a system that continues to operate in the same mode when a fault occurs. Furthermore, this approach provides a real-time solution in which the operation of the vehicle is not interrupted during any part of the process. It is also noted that different reconfiguration algorithms may be defined for the same sensor fault and utilized in different modes of operation, such as the flow sharing and non-flow sharing modes.

The invention claimed is:

1. A control system for controlling a hydraulic actuation system of a construction vehicle, the control system comprising:
   a supervisory controller adapted to interface with a main controller of the construction vehicle, the supervisory controller being at a supervisory control level of the hydraulic actuation system;
   a plurality of control nodes that interface with the supervisory controller, the control nodes including pressure and position sensors, the plurality of control nodes including:
      a first actuator control node for controlling operation of a first hydraulic actuator;
      a second actuator control node for controlling operation of a second hydraulic actuator;
      a pump control node; and
   wherein the control system has a fault detection architecture in which faults are detected within the control nodes at: a) a sensor level; b) a component level; and c) a subsystem level.

2. The control system of claim 1, wherein at least some faults are isolated at the supervisory control level.

3. The control system of claim 1, wherein the construction vehicle is an excavation vehicle having a boom with a pivotal component, wherein the first hydraulic actuator comprises a boom lift cylinder for raising and lowering the boom, and wherein the second hydraulic actuator comprises a pivot cylinder for pivoting the pivotal component of the boom.

4. The control system of claim 3, wherein the excavation vehicle is a wheel loader.

5. The control system of claim 3, wherein the plurality of control nodes includes a boom suspension system control node.

6. The control system of claim 1, wherein each of the plurality of control nodes is in communication with the supervisory controller without being in direct cross communication with another of the control nodes.

7. The control system of claim 1, wherein the first actuator control node includes a first node controller in communication with the supervisory controller and the second actuator control node includes a second node controller in communication with the supervisory controller.

8. The control system of claim 1, wherein the pump control node includes a pump node controller in communication with the supervisory controller.

9. The control system of claim 7, wherein the first actuator control node includes a first control valve assembly in communication with the first node controller and the second actuator control node includes a second control valve assembly in communication with the second node controller.

10. The control system of claim 9, wherein the pressure and position sensors of the first actuator control node are in communication with the first node controller and the pressure and position sensors of the second actuator control node are in communication with the second node controller.

11. The control system of claim 9, wherein the first node controller is configured to send a pulse width modulation signal to the first control valve assembly and the second node controller is configured to send a pulse width modulation signal to the second control valve assembly.

12. The control system of claim 2, wherein the supervisory controller is configured to isolate faults associated with the pressure and position sensors of the control nodes that are not able to be isolated at the control node level.

13. The control system of claim 5, wherein the plurality of control nodes includes a tank control unit node.

14. The control system of claim 1, wherein the plurality of control nodes includes at least one of a boom suspension system control node, a tank control unit node, and an auxiliary control node.

15. The control system of claim 1, wherein each of the plurality of control nodes sends a fault status signal to the supervisory controller when a fault has been detected at the sensor level, the component level, or the subsystem level.

16. the control system of claim 15, wherein the fault status signal indicates whether the detected fault has been isolated at the subsystem level.

17. The control system of claim 1, wherein the supervisory controller communicates the fault status signals of each of the plurality of control nodes to the other of the plurality of control nodes.

* * * * *